United States Patent
Ding et al.

(10) Patent No.: US 12,445,968 B2
(45) Date of Patent: Oct. 14, 2025

(54) TRANSMIT POWER CONTROL METHOD, TERMINAL, CHIP SYSTEM, AND SYSTEM

(71) Applicant: HUAWEI TECHNOLOGIES CO., LTD., Guangdong (CN)

(72) Inventors: Rentian Ding, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 459 days.

(21) Appl. No.: 17/913,839

(22) PCT Filed: Mar. 24, 2021

(86) PCT No.: PCT/CN2021/082745
§ 371 (c)(1),
(2) Date: Sep. 23, 2022

(87) PCT Pub. No.: WO2021/197163
PCT Pub. Date: Oct. 7, 2021

(65) Prior Publication Data
US 2023/0354202 A1    Nov. 2, 2023

(30) Foreign Application Priority Data
Mar. 28, 2020   (CN) .................. 202010232750.7

(51) Int. Cl.
*H04W 52/08*    (2009.01)
*H04W 52/34*    (2009.01)
*H04W 52/50*    (2009.01)

(52) U.S. Cl.
CPC .......... *H04W 52/08* (2013.01); *H04W 52/34* (2013.01); *H04W 52/50* (2013.01)

(58) Field of Classification Search
CPC ..... H04W 52/08; H04W 52/34; H04W 52/50; H04W 52/246; H04W 52/36
See application file for complete search history.

(56) References Cited

U.S. PATENT DOCUMENTS

2019/0223077 A1    7/2019  Kwok
2019/0320396 A1   10/2019  Bagheri et al.
(Continued)

FOREIGN PATENT DOCUMENTS

CN    109309954 A    2/2019
CN    109691188 A    4/2019
(Continued)

OTHER PUBLICATIONS

NGMN Alliance: "Definition of the Testing Framework for the NGMN 5G TTI Interoperability", 3GPP Draft;Sep. 10, 2018_Interoperability_Framwork_Definition_V10, 3rd Generation Partnership Project (3GPP), Mobile Competence Centre 650, Route Des Lucioles ; F-06921 Sophia-Antipolis Cedex ; France, No. ; Aug. 1, 2018, Sep. 10, 2018 (Sep. 10, 2018), XP051562075, 59 pages.

*Primary Examiner* — John J Lee

(57) ABSTRACT

This application provides a transmit power control method, a terminal, a chip system, and a system. The method includes: A terminal connects to a 4G network device over an LTE link and connects to a 5G network device over an NR link, where transmit power of the NR link is first transmit power; determines to send a first data packet over the NR link, where the first data packet is a preset data packet; adjusts the first transmit power to second transmit power, where the second transmit power is greater than the first transmit power; and sends the first data packet at the second transmit power over the NR link.

14 Claims, 14 Drawing Sheets

(56) References Cited

U.S. PATENT DOCUMENTS

| | | | |
|---|---|---|---|
| 2020/0022097 A1 | 1/2020 | Wang et al. | |
| 2020/0107169 A1* | 4/2020 | Chin | H04L 61/5038 |
| 2020/0329436 A1* | 10/2020 | Liu | H04W 52/281 |
| 2022/0167335 A1* | 5/2022 | Go | H04W 52/146 |

FOREIGN PATENT DOCUMENTS

| | | |
|---|---|---|
| CN | 109842927 A | 6/2019 |
| CN | 110035485 A | 7/2019 |
| CN | 110495222 A | 11/2019 |
| CN | 110506440 A | 11/2019 |
| CN | 110831140 A | 2/2020 |
| EP | 3606191 A1 | 2/2020 |
| WO | 2018171365 A1 | 9/2018 |
| WO | 2019125021 A1 | 6/2019 |

* cited by examiner

TRANSMIT POWER CONTROL METHOD, TERMINAL, CHIP SYSTEM, AND SYSTEM

CROSS-REFERENCE TO RELATED APPLICATIONS

This application is a national stage of International Application No. PCT/CN2021/082745, filed on Mar. 24, 2021, which claims priority to Chinese Patent Application No. 202010232750.7, filed on Mar. 28, 2020. Both of the aforementioned applications are hereby incorporated by reference in their entireties.

TECHNICAL FIELD

This application relates to the field of mobile communications technologies, and in particular, to a transmit power control method, a terminal, a chip system, and a system.

BACKGROUND

There are two deployment modes of a 5th generation (5th generation, 5G) network. One is a standalone (Standalone, SA) mode, that is, a 5G gNB is directly connected to a core network, and can work independently. The other is a non-standalone (Non-Standalone, NSA) mode, that is, a 5G gNB is not directly connected to a core network, but needs to depend on a 4th generation (4th generation, 4G) eNB to access the core network. In the NSA mode, a terminal may communicate with the 4G eNB or the 5G gNB. This mode is also referred to as a dual connectivity (Dual Connectivity, DC) mode.

In the DC mode, the terminal directly communicates with the 4G eNB in some service modes, and the terminal communicates with the 4G eNB through the 5G gNB in other service modes (that is, in an uplink direction, the terminal sends uplink data to the 5G gNB, and the 5G gNB sends the uplink data to the 4G eNB; and in a downlink direction, the 4G eNB sends downlink data to the 5G gNB, and the 5G gNB sends the downlink data to the terminal).

The terminal working in the DC mode faces a problem of transmit power allocation, that is, allocation between transmit power for sending uplink data to the 5G gNB and transmit power for sending uplink data to the 4G eNB. If power allocation is improper, there may be no power for transmitting some uplink data, and consequently normal running of a service is affected.

SUMMARY

This application provides a transmit power control method, a terminal, a chip system, and a system, so that a terminal working in a DC mode can properly allocate transmit power.

According to a first aspect, a transmit power control method is provided, and the method may be implemented by a terminal. The method includes: A terminal connects to a 4G network device over an LTE link and connects to a 5G network device over an NR link, where transmit power of the NR link is first transmit power; determines to send a first data packet over the NR link, where the first data packet is a preset data packet; adjusts the first transmit power to second transmit power, where the second transmit power is greater than the first transmit power; and sends the first data packet at the second transmit power over the NR link.

That is, in this application, when determining that the preset data packet needs to be sent over the NR link, the terminal working in a DC mode increases the transmit power of the NR link, to ensure as much as possible that there is sufficient transmit power for sending the preset data packet. This avoids retransmission.

In a possible design, the method further includes: The terminal determines to send a second data packet over the LTE link; determines that transmit power of the LTE link is third transmit power, where a sum of the third transmit power and the second transmit power is less than or equal to total transmit power of the terminal; and sends the second data packet at the third transmit power over the LTE link.

That is, in this embodiment of this application, when determining that the preset data packet needs to be sent over the NR link, the terminal working in the DC mode increases the transmit power of the NR link. If the second data packet further needs to be sent over the LTE link, a sum of the transmit power allocated to the LTE link and increased transmit power of the NR link is less than or equal to the total transmit power of the terminal, to ensure as much as possible that there is sufficient transmit power for the preset data packet. This avoids retransmission.

In a possible design, the second transmit power is a preset value, or transmit power calculated based on a power control parameter corresponding to the first data packet, and the power control parameter includes at least one of a resource bandwidth occupied by the first data packet or a closed-loop power control adjustment value of a channel corresponding to the first data packet.

Therefore, in this embodiment of this application, when determining that the preset data packet needs to be sent over the NR link, the terminal working in the DC mode increases the transmit power of the NR link, for example, increases the transmit power to a preset value, or increases the transmit power to a value calculated based on the power control parameter corresponding to the first data packet, to ensure as much as possible that there is sufficient transmit power for sending the preset data packet. This avoids retransmission.

In a possible design, the first data packet is a data packet generated by a preset application in the terminal, or a data packet generated in a preset scenario in a preset application, or a data packet whose priority is higher than a preset priority. It should be noted that the foregoing merely lists several examples of the first data packet. This is not limited in this embodiment of this application.

Therefore, in this embodiment of this application, there is sufficient transmit power for sending the preset data packet on the NR link in the terminal, to avoid retransmission.

In a possible design, the first data packet includes at least one of the following: an NR PUCCH, an NR SRS, or an NR PRACH. It should be noted that the foregoing merely lists several examples of the first data packet. This is not limited in this embodiment of this application.

It should be understood that, if the terminal can send an NR PUCCH, an NR SRS, an NR PRACH, or the like to an NR network device in time, the NR network device can send downlink data to the terminal, to ensure that a service between the terminal and the NR network device is not interrupted. Therefore, in this embodiment of this application, when the terminal working in the DC mode determines that the NR PUCCH, the NR SRS, or the NR PRACH needs to be sent over the NR link, the terminal increases the transmit power of the NR link, to ensure as much as possible that there is sufficient transmit power. This avoids retransmission, and avoids impact on the service between the terminal and the NR network device.

In a possible design, before the terminal adjusts the first transmit power to the second transmit power, the method further includes: determining that the first transmit power does not satisfy a transmit power requirement of the first data packet.

That is, in this embodiment of this application, when the terminal working in the DC mode determines that the preset data packet needs to be sent over the NR link, if the current first transmit power of the NR link does not satisfy the first data packet, the terminal increases the transmit power of the NR link, to ensure as much as possible that there is sufficient transmit power for the preset data packet. This avoids retransmission.

According to a second aspect, a terminal is further provided, including:
a processor; and
a computer storage medium, where the computer storage medium includes instructions, and when the processor executes the instructions, the terminal is enabled to perform the following actions:
connecting, by the terminal, to a 4G network device over an LTE link and connecting to a 5G network device over an NR link, where transmit power of the NR link is first transmit power;
determining to send a first data packet over the NR link, where the first data packet is a preset data packet;
adjusting the first transmit power to second transmit power, where the second transmit power is greater than the first transmit power; and
sending the first data packet at the second transmit power over the NR link.

In a possible design, the terminal further performs the following actions:
determining to send a second data packet over the LTE link;
determining that transmit power of the LTE link is third transmit power, where a sum of the third transmit power and the second transmit power is less than or equal to total transmit power of the terminal; and
sending the second data packet at the third transmit power over the LTE link.

In a possible design, the second transmit power is a preset value, or transmit power calculated based on a power control parameter corresponding to the first data packet, and the power control parameter includes at least one of a resource bandwidth occupied by the first data packet or a closed-loop power control adjustment value of a channel corresponding to the first data packet.

In a possible design, the first data packet is a data packet generated by a preset application in the terminal, or a data packet generated in a preset scenario in a preset application, or a data packet whose priority is higher than a preset priority.

In a possible design, the first data packet includes at least one of the following: an NR PUCCH, an NR SRS, or an NR PRACH.

In a possible design, the terminal further performs the following action: determining that the first transmit power does not satisfy a transmit power requirement of the first data packet.

According to a third aspect, a chip system is further provided, applied to a terminal. The chip system includes an application processor and a baseband processor.

The application processor is configured to:
run an application in response to a user operation to generate a first data packet; and
send the first data packet.
The baseband processor is configured to:
receive the first data packet;
determine to send the first data packet over an NR link; and
when the first data packet is a preset data packet, adjust first transmit power of the NR link to second transmit power, where the second transmit power is greater than the first transmit power; and send the first data packet at the second transmit power over the NR link.

In a possible design, the application processor is further configured to:
generate and send a second data packet.
The baseband processor is further configured to:
receive the second data packet;
determine to send the second data packet over an LTE link; and
determine that transmit power of the LTE link is third transmit power, where a sum of the third transmit power and the second transmit power is less than or equal to total transmit power of the terminal; and send the second data packet at the third transmit power over the LTE link.

In a possible design, the second transmit power is a preset value, or transmit power calculated based on a power control parameter corresponding to the first data packet, and the power control parameter includes at least one of a resource bandwidth occupied by the first data packet or a closed-loop power control adjustment value of a channel corresponding to the first data packet.

In a possible design, the first data packet is a data packet generated by a preset application in the terminal, or a data packet generated in a preset scenario in a preset application, or a data packet whose priority is higher than a preset priority.

In a possible design, the first data packet includes at least one of the following: an NR PUCCH, an NR SRS, or an NR PRACH.

According to a fourth aspect, a system is further provided, including:
a 4G network device, configured to provide a 4G network service for a terminal;
a 5G network device, configured to provide a 5G network service for the terminal; and
the terminal, configured to connect to the 4G network device over an LTE link and connect to the 5G network device over an NR link, where transmit power of the NR link is first transmit power.

The terminal is further configured to: when determining to send a first data packet over the NR link, where the first data packet is a preset data packet, adjust the first transmit power to second transmit power, and send the first data packet at the second transmit power over the NR link, where the second transmit power is greater than the first transmit power.

In a possible design, the terminal is further configured to:
determine to send a second data packet over the LTE link;
determine that transmit power of the LTE link is third transmit power, where a sum of the third transmit power and the second transmit power is less than or equal to total transmit power of the terminal; and
send the second data packet at the third transmit power over the LTE link.

In a possible design, the second transmit power is a preset value, or transmit power calculated based on a power control parameter corresponding to the first data packet, and the power control parameter includes at least one of a resource bandwidth occupied by the first data packet or a closed-loop power control adjustment value of a channel corresponding to the first data packet.

In a possible design, the first data packet is a data packet generated by a preset application in the terminal, or a data packet generated in a preset scenario in a preset application, or a data packet whose priority is higher than a preset priority.

In a possible design, the first data packet includes at least one of the following: an NR PUCCH, an NR SRS, or an NR PRACH.

According to a fifth aspect, a terminal is further provided, including modules/units configured to perform the method in any one of the first aspect or the possible designs of the first aspect. These modules/units may be implemented by hardware, or may be implemented by hardware by executing corresponding software.

According to a sixth aspect, a computer program product including instructions is further provided. When the computer program product is run on a computer, the computer is enabled to perform the method provided in the first aspect.

According to a seventh aspect, a computer storage medium is further provided, including computer instructions. When the computer instructions are run on an electronic device, the electronic device is enabled to perform the method provided in the first aspect.

For beneficial effects of the second aspect to the seventh aspect, refer to the beneficial effects of the first aspect or the second aspect. Details are not described again.

DESCRIPTION OF EMBODIMENTS

Figure 1:
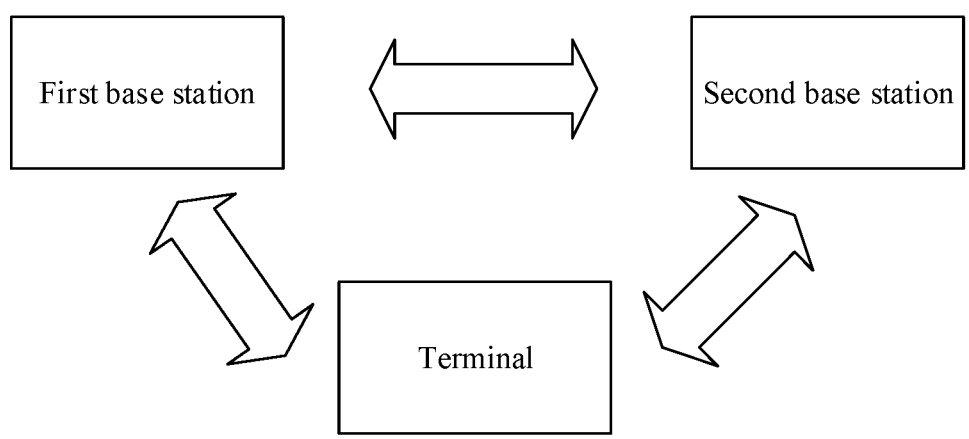
FIG. 1 is a schematic diagram of a dual connectivity mode according to an embodiment of this application.

The following describes some terms in embodiments of this application, to facilitate understanding by a person skilled in the art.

(1) A terminal (terminal) in this application includes a device that provides a user with voice and/or data connectivity, for example, may include a handheld device with a wireless connection function or a processing device connected to a wireless modem. The terminal may communicate with a core network over a radio access network (radio access network, RAN), and exchange voice and/or data with the RAN. The terminal may include user equipment (user equipment, UE), a wireless terminal, a mobile terminal, a subscriber unit (subscriber unit), a subscriber station (subscriber station), a mobile station (mobile station), a mobile console (mobile), a remote station (remote station), an access point (access point, AP), a remote terminal (remote terminal), an access terminal (access terminal), a user terminal (user terminal), a user agent (user agent), a user device (user device), or the like. For example, the terminal may include a mobile phone (or referred to as a "cellular" phone), a computer having a mobile terminal, a portable, pocket-sized, handheld, computer built-in mobile apparatus, or a smart wearable device. For example, the terminal may be a device such as a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal may alternatively include a limited device, for example, a device with relatively low power consumption, a device with a limited storage capability, or a device with a limited computing capability. For example, the terminal includes an information sensing device such as a barcode, a radio frequency identification (radio frequency identification, RFID) reader, a sensor, a global positioning system (global positioning system, GPS), or a laser scanner.

As an example instead of a limitation, in embodiments of this application, the terminal may alternatively be a wearable device. The wearable device may also be referred to as a wearable intelligent device, and is a general term of wearable devices that are intelligently designed and developed for daily wear by using a wearable technology, for example, glasses, gloves, a watch, clothing, and shoes. The wearable device is a portable device that is directly worn on the body or integrated into clothes or accessories of a user. The wearable device is more than a hardware device, and is also used to implement a powerful function through software support, data exchange, and cloud interaction. In a broad sense, the wearable intelligent device includes a full-featured and large-sized device that can implement all or some of functions without depending on a smartphone, for example, a smart watch or smart glasses, and includes a device that focuses on only one type of application function and needs to collaboratively work with another device such as the smartphone, for example, various smart bands, smart helmets, or smart jewelry for monitoring physical signs.

If the terminals described above are located on a vehicle (for example, placed in the vehicle or installed in the vehicle), the terminals may be considered as vehicle-mounted terminals. For example, the vehicle-mounted terminal is also referred to as an on-board unit (on-board unit, OBU).

In embodiments of this application, an apparatus configured to implement a function of the terminal may be a terminal device, or may be an apparatus such as a chip system that can support the terminal device in implementing the function. The apparatus may be installed in the terminal device. In embodiments of this application, the chip system may include a chip, or may include a chip and another discrete component. The following uses an example in which the apparatus configured to implement the function of the terminal is the terminal device.

(2) A network device in this application may be a device configured to communicate with the terminal. In embodiments of this application, the network device may be referred to as a radio access network (radio access network, RAN) device. For example, the network device includes an access network (access network, AN) device such as a base station (for example, an access point), and may be a device that communicates with a wireless terminal through one or more cells on an air interface in an access network. Alternatively, a network device in a V2X technology is, for example, a road side unit (road side unit, RSU). The base station may be configured to mutually convert a received over-the-air frame and an internet protocol (IP) packet and serve as a router between the terminal and the remaining part of the access network, where the remaining part of the access network may include an IP network. The RSU may be a fixed infrastructure entity that supports a V2X application, and may exchange a message with another entity that supports the V2X application. The network device may further coordinate attribute management of the air interface. For example, the network device may include an evolved NodeB (NodeB, eNB, or e-NodeB, evolutional NodeB) in a long term evolution (long term evolution, LTE) system or a long term evolution-advanced (long term evolution-advanced, LTE-A) system, may include a next generation NodeB (next generation NodeB, gNB) in an NR system, or may include a centralized unit (centralized unit, CU) and a distributed unit (distributed unit, DU) in a cloud radio access network (cloud radio access network, Cloud RAN) system. This is not limited in embodiments of this application.

In embodiments of this application, an apparatus configured to implement a function of the network device may be a network device, or may be an apparatus such as a chip system that can support the network device in implementing the function. The apparatus may be installed in the network device. The following uses an example in which the apparatus configured to implement the function of the network device is the network device.

(3) A resource in embodiments of this application may also be referred to as a transmission resource, including one or more of a time domain resource, a frequency domain resource, and a code channel resource. The resource may be used to carry data or signaling in an uplink communication process or a downlink communication process.

(4) Terms "system" and "network" in embodiments of this application may be used interchangeably. "A plurality of" means two or more, and another quantifier is similar. The term "and/or" describes an association relationship for describing associated objects and represents that three relationships may exist. For example, A and/or B may represent the following three cases: Only A exists, both A and B exist, and only B exists. In addition, elements (element) such as "a", "an", and "the" that appear in singular forms do not mean "one or only one" unless otherwise specified in the context, but mean "one or more". For example, "a device" means one or more such devices. Further, "at least one of (at least one of) . . . " means one or any combination of subsequent associated objects. For example, "at least one of A, B, and C" includes A, B, C, AB, AC, BC, or ABC. It should be understood that, in embodiments of this application, "B corresponding to A" indicates that B is associated with A, and B may be determined based on A. However, it should be further understood that determining B based on A does not mean that B is determined based only on A, and B may alternatively be determined based on A and/or other information.

It should be noted that, in description of this application, words such as "first" and "second" are merely used for distinction and description, and cannot be understood as an indication or implication of relative importance or an indication or implication of an order. For example, a "first indication" and a "second indication" merely represent two different indications, and do not have a sequence or relative importance.

(5) A "connection" in embodiments of this application means various connection modes such as a direct connection or an indirect connection, to implement communication between devices. This is not limited in embodiments of this application.

The following describes technical solutions in embodiments of this application with reference to the accompanying drawings in embodiments of this application.

In a wireless system, when coordinated networking is performed on base stations or access points of different standards, a same standard, and different systems, because a bandwidth resource and a coverage area of a single base station are limited, radio resources of a plurality of cells or base stations are centralized to provide a service for a user. This can meet a capacity requirement and a coverage requirement of the user more easily. Usually, this mode is referred to as multi-connectivity.

For example, in an LTE system, common multi-connectivity modes include carrier aggregation, coordinated multipoint transmission/reception (Coordinated Multipoint transmission/reception, CoMP), and dual connectivity. Specifically, dual connectivity (Dual Connectivity, DC for short below) is a mode in which a terminal (UE) is connected to two cells. One master cell group (Master Cell Group) and one secondary cell group (Secondary Cell Group) are configured for the UE (terminal device), to provide a performance solution in a non-ideal condition of transmission between base stations. It should be noted that, in this application, dual connectivity between 4G LTE (Long Term Evolution, long term evolution) and 5G NR (New Radio, 5G access network) is used as an example. This is not limited to a connection between 4G and 5G, or may be a connection between a plurality of different communications standards, for example, between 3G and 4G, or between 5G and 6G. As shown in FIG. 1, a first base station may be an LTE eNB, and a second base station may be a gNB. In a possible implementation, there may be a connection between base stations of different types in a same-generation communications technology, for example, between an LTE eNB and an enhanced LTE eNB (eNB). In a possible design, there may be a connection between different access points or systems, for example, between an LTE access point and an access point such as Wi-Fi or Bluetooth. In a possible design, this application may also be extended to a multi-connectivity technology. For example, a plurality of base stations of different standards, or a system including different systems such as a base station and Wi-Fi may be connected.

Figure 2:
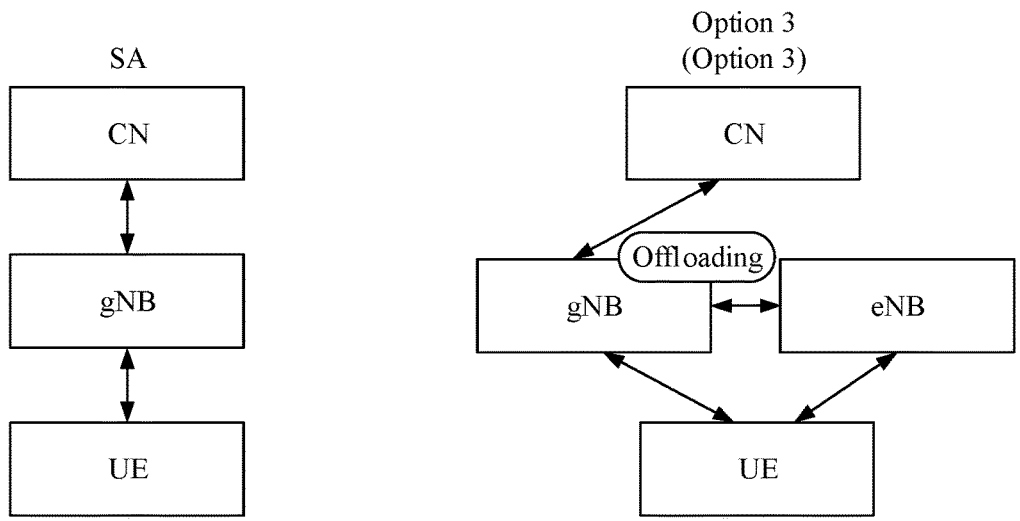
FIG. 2 is a schematic diagram of an SA architecture and an NSA architecture according to an embodiment of this application.
Figure 2:
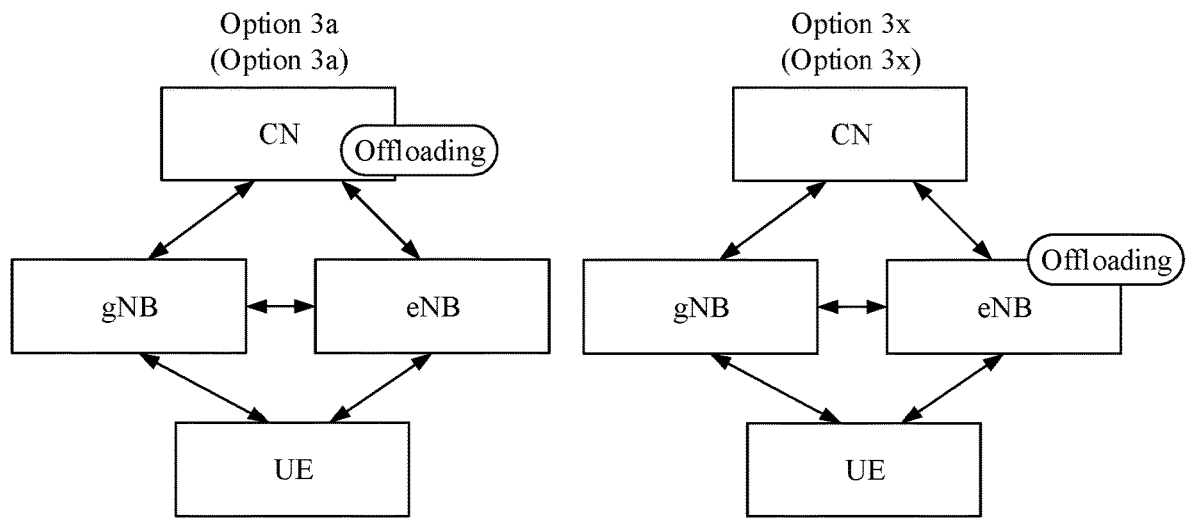

An existing 5G standard defines a plurality of networking modes, including a standalone (Standalone, SA for short) mode and a non-standalone (Non-standalone, NSA for short)

mode. FIG. 2 is a schematic diagram of an SA architecture and an NSA architecture. SA is relatively simple, and an NR gNB is directly connected to a core network (for example, a 5G core network). In an uplink direction, a terminal sends uplink data to the NR gNB, and the NR gNB sends the uplink data to the core network. In a downlink direction, the core network sends downlink data to the NR gNB, and the NR gNB sends the downlink data to the terminal. NSA may have a plurality of networking modes, for example, a plurality of possible modes such as Option 3/3a/3x, Option 4/4a, and Option 7/7a/7x. Option 3/3a/3x is used as an example in FIG. 1. A 4G eNB (eNB) is a master eNB, a 5G gNB (gNB) is a secondary eNB, an LTE core network is still used, and no new 5G core network is required. All control plane signaling is forwarded by the eNB. There are three corresponding modes of data flow transmission: The eNB may offload data to the gNB (namely, Option 3), or an EPC (Evolved Packet Core, LTE core network) offloads data to the gNB (Option 3a), or the gNB may offload data to the eNB (Option 3x). In this scenario, the eNB is the master eNB, and all the control plane signaling is forwarded by the eNB. The LTE eNB and the NR (New Radio) gNB provide a high data rate service for a user through dual connectivity. Option 4/4a is used as an example. Both an NGC (Next Generation Core) and the gNB are introduced to Option 4. However, the gNB does not directly replace the eNB. In this scenario, a 5G NGC is used as the core network, and both the eNB and the gNB are connected to the NGC. All the control plane signaling is forwarded by the gNB. There are two corresponding modes of data flow transmission: The gNB offloads the data to the eNB, or the NGC offloads the data to the eNB.

The foregoing provides only examples of several common typical DC connection modes. This is not limited in this application.

It should be noted that DC in a 4G-5G standard indicates that the UE maintains dual connectivity to both the 4G eNB and the 5G gNB, and transmits a service by using radio resources of the 4G eNB and the 5G gNB. In DC, data transmission may be performed in a split (split) bearer mode (which may also be referred to as a data offloading mode). A control plane is carried in the master eNB, and data may be carried in the master eNB and the secondary eNB. Based on distribution of the data on the master eNB and the secondary eNB, there may be four types of DC bearers:
 a. MCG bearer (the data is only on the master eNB)
 b. SCG bearer (the data is only on the secondary eNB)
 c. MCG split bearer (the data is offloaded on the master eNB)
 d. SCG split bearer (the data is offloaded on the secondary eNB)

Figure 3:
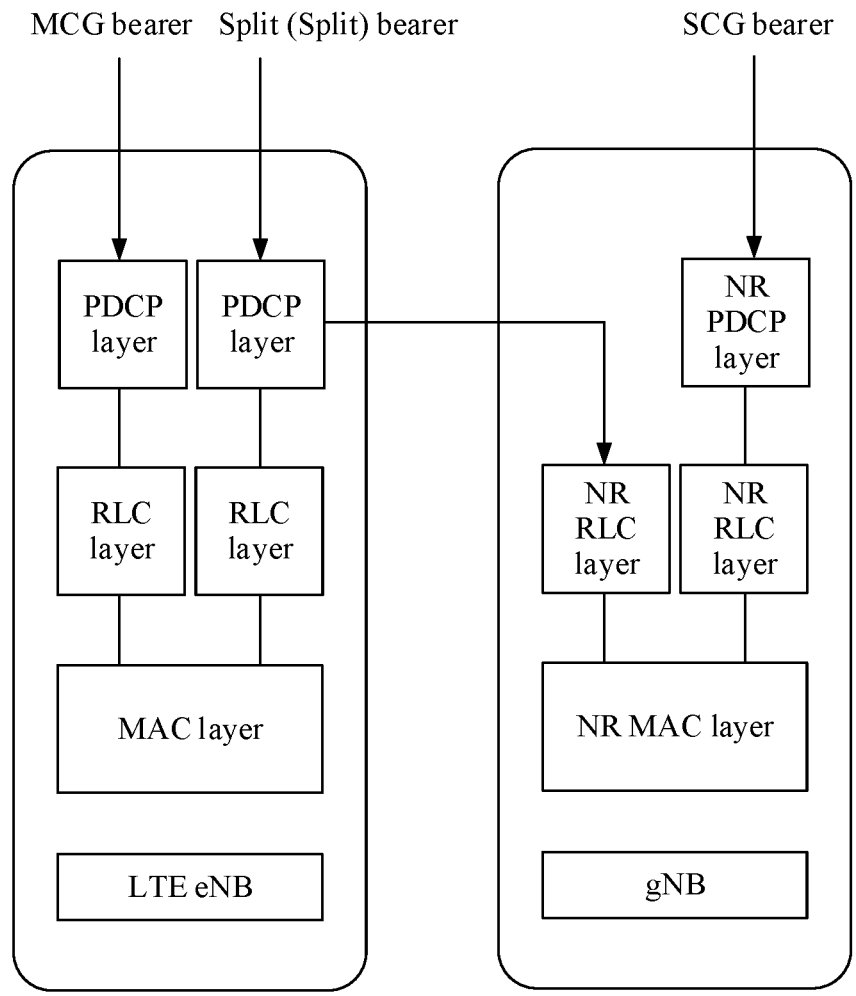
FIG. 3 is a first schematic diagram of data offloading according to an embodiment of this application.

FIG. 3 is a first schematic diagram of data offloading according to an embodiment of this application.

As shown in FIG. 3, in dual connectivity, an S1-U connection exists only between a MeNB and a core network, and a SeNB is not directly connected to the core network, but is connected to the core network by using the MeNB. In a downlink direction, all downlink data flows are first transmitted to the MeNB. Then, the MeNB performs offloading according to a specific algorithm and proportion, and sends some data (for example, through an X2 interface) to the SeNB. Finally, the MeNB and the SeNB separately deliver the data to UE. That is, a split bearer is established on the MeNB, that is, an eNB. By using the split bearer, the downlink data flow is forwarded at a PDCP layer on an eNB side to an RLC layer on a gNB side (for example, through an Xx interface), and the remaining downlink data is sent to a terminal through local RLC on the eNB side. Therefore, the terminal may obtain the downlink data from the two base stations, to implement a load sharing function.

In this case, one PDCP entity may be associated with two RLC (Radio Link Control, radio link control) entities, which may be understood as that the PDCP layer transmits the data flow to the RLC layer over RLC1 and RLC2 links. Specifically, the RLC1 link may be understood as an LTE link, the RLC2 link may be understood as an NR link, and each RLC entity separately corresponds to an LTE air interface and an NR air interface. In this scenario, for the data flow of the PDCP layer, a PDCP packet is separately sent on the LTE air interface and the NR air interface based on an obtained grant. This mode may be referred to as an MCG split bearer mode.

Similarly, if the PDCP layer is associated with only one RLC entity, data at the PDCP layer is directly transmitted to the RLC layer. This mode is referred to as an MCG bearer (the data is transmitted only on a master eNB).

Similarly, if data is transmitted at an NR PDCP layer, that is, the data is transmitted on a secondary eNB, only one NR RLC entity is associated, that is, the data at the NR PDCP layer is directly transmitted to an NR RLC layer. This mode is referred to as an SCG bearer (the data is transmitted only on the secondary eNB).

In some embodiments, each RLC entity may correspond to at least one bearer link. In some embodiments, there may be a plurality of RLC entities at the RLC layer.

Figure 4:
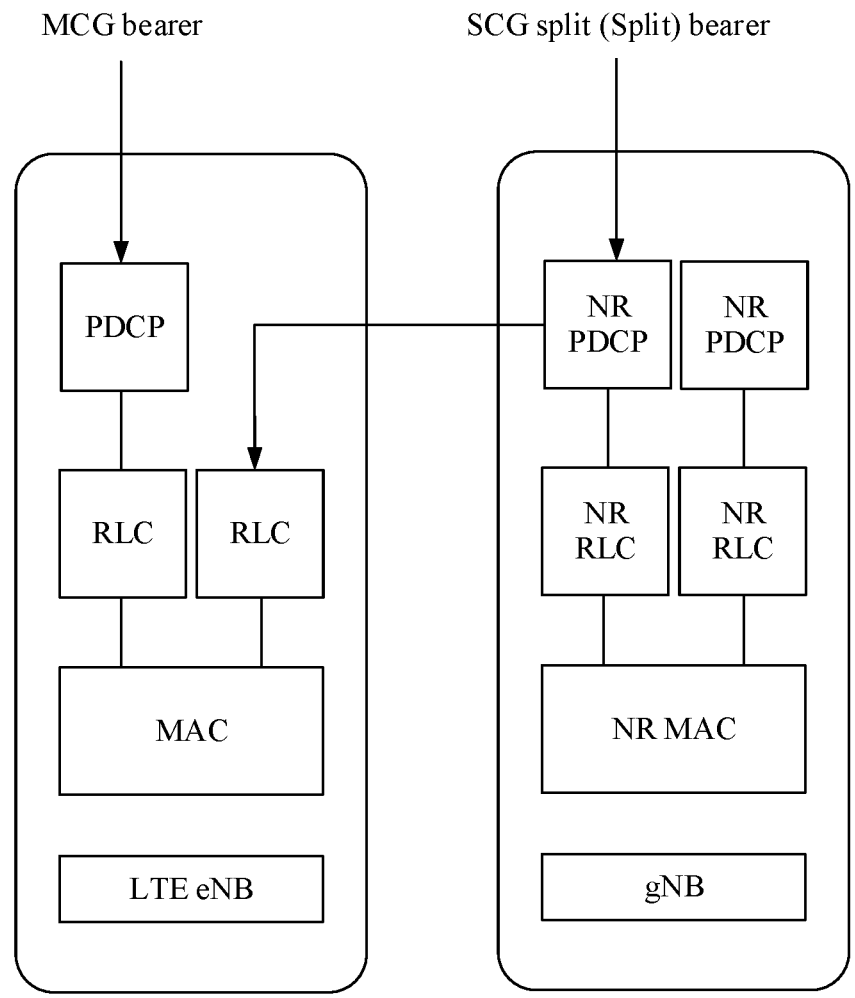
FIG. 4 is a second schematic diagram of data offloading according to an embodiment of this application.

FIG. 4 is a second schematic diagram of data offloading according to an embodiment of this application.

As shown in FIG. 4, an LTE eNB is a master eNB, a gNB is a secondary eNB, a split bearer is established on the SeNB, that is, the gNB, and a data flow is offloaded on the gNB. For example, uplink data of a terminal is offloaded on the SeNB, some uplink data is transmitted by using the SeNB, and some uplink data is transmitted by using the MeNB. A mode of offloading the data flow on the gNB is as follows: The data flow is offloaded at a PDCP layer on a gNB side, and forwarded to an RLC layer on an eNB side (for example, through an Xx interface). Therefore, one NR PDCP entity may be associated with two RLC (Radio Link Control, radio link control) entities, and correspond to an NR RLC layer and an RLC layer. In this case, data is offloaded on a secondary bearer. This mode is referred to as an SCG split bearer (the data is offloaded on the secondary eNB).

In this case, to avoid a processing capability bottleneck of a 4G eNB, minimize upgrade of the original 4G eNB, and minimize costs of device research and development and network construction, an SCG split bearer may also be stipulated in LTE-NR dual connectivity. To be specific, a downlink data flow may be transmitted from a 5G secondary eNB to a 4G master eNB and then to a mobile phone.

The split bearer mode needs to resolve a problem of transmit power allocation. For example, FIG. 3 is used as an example. The split bearer mode in FIG. 3 is established on the MeNB, that is, the LTE eNB. The LTE eNB needs to offload downlink data to be sent to the terminal and the NR gNB. Therefore, an LTE eNB side faces a problem of transmit power allocation. For another example, FIG. 4 is used as an example. The split bearer mode in FIG. 4 is established on the SeNB, that is, the NR gNB. The NR gNB needs to offload uplink data to be sent to the LTE eNB and the core network. Therefore, an NR gNB side faces a problem of transmit power allocation. For another example, because the terminal needs to offload uplink data to be sent to the MeNB and the SeNB, the terminal also faces a problem of transmit power allocation. In this application, a transmit power control solution provided in embodiments of this application is mainly described by using an example in which the terminal offloads the sent uplink data.

Figure 5:
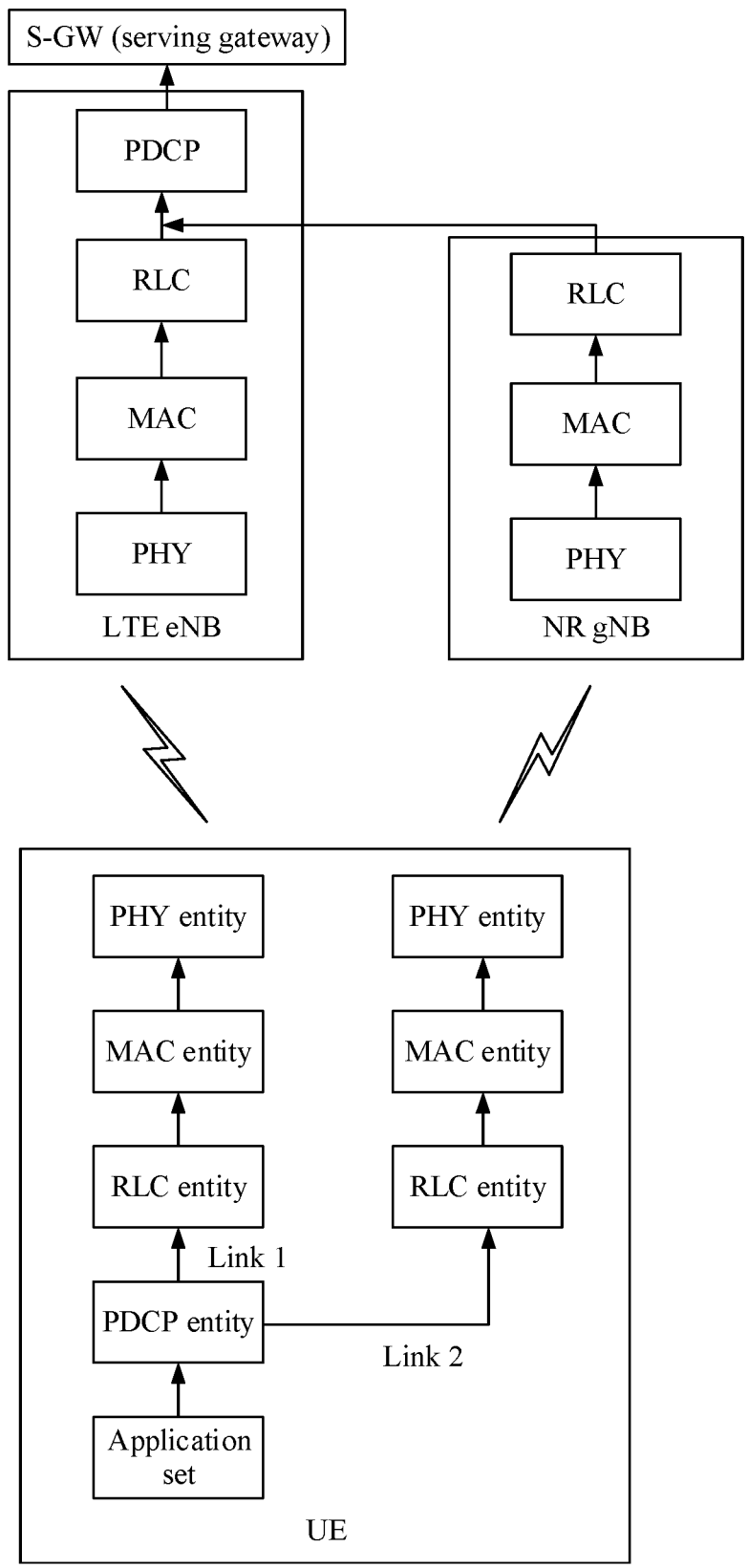
FIG. 5 is a third schematic diagram of data offloading according to an embodiment of this application.

FIG. 5 is a third schematic diagram of data offloading according to an embodiment of this application.

As shown in FIG. 5, during uplink data transmission, after data flows are converged at a PDCP layer, offloading and transmission may be performed according to a predefined policy. For example, some uplink data is offloaded to a link 1, and some uplink data is offloaded to a link 2. Sufficient transmit power needs to be allocated to the link 1 or the link 2 to send the uplink data. In some embodiments, in a scenario in which the link 1 and the link 2 are concurrent, transmit power of the link 1 and transmit power of the link 2 are determined based on a priority of the uplink data on the link 1 or the link 2. In other embodiments, transmit power of the link 1 or transmit power of the link 2 is determined based on whether the uplink data on the link 1 or the link 2 is preset uplink data.

It should be noted that the link 1 and the link 2 in the figure are for ease of description, and are not intended to limit this application.

UE (user equipment) in this application may be an electronic device of any application-oriented type for a consumer to use. An example of the user equipment includes but is not limited to a smartphone, a tablet computer, a television, a projector, a smart watch, smart glasses (for example, Google glasses), a wearable accessory (for example, a smart wristwatch, a T-shirt, a necklace, or shoes), a media (for example, music and/or video) player, a game console, a game console and controller, an ebook (ebook) reader, a cloud terminal, or an in-vehicle media system. The user equipment may be a wearable device (for example, the smart watch or the smart glasses) or a non-wearable device (for example, the television or the tablet computer). In addition, the user equipment may have any suitable operating system (OS), for example, Android, iOS, Windows, Linux, or UNIX.

Further, the user equipment may support a plurality of mobile communications technologies of different standards, including 2G/3G/4G/5G, and may further support Wi-Fi, Bluetooth, and the like.

In some implementations, there may be a plurality of entities at one layer. For example, there may be two RLC entities at an RLC layer, and the two RLC entities correspond to two bearer links. This is not limited in this application. As shown in FIG. 5, it may be understood that there are an RLC1 entity and an RLC2 entity at the RLC layer. The RLC1 entity supports LTE data transmission, and the RLC2 entity supports NR data transmission. However, this is not limited in this application.

Uplink data is used as an example. An application set in the terminal includes various applications, and uplink data is generated when the application in the terminal is run. For example, when the user makes a call to another terminal by using a "phone" application in the terminal, the terminal generates uplink data. For example, the uplink data includes a voice data packet sent by the user. When the uplink data is transmitted to the PDCP layer by using the application set, the uplink data is offloaded to the link 1 or the link 2, and the terminal allocates transmit power to the link 1 and the link 2 to send the uplink data.

It should be noted that, to improve data sending efficiency of the terminal, the terminal may simultaneously send the uplink data on the link 1 and the link 2 in a same time period. The transmit power needs to be allocated to both the link 1 and the link 2. However, total transmit power of the terminal is usually limited, for example, cannot exceed 23 dBm at most. Therefore, the terminal working in a DC mode needs to properly allocate transmit power.

Currently, two power allocation mechanisms are defined in a protocol.

One is a semi-static power allocation mechanism, that is, an NR gNB and an LTE eNB each allocate transmit power to the terminal. For example, the transmit power allocated by the NR gNB to the terminal is Pnr, and the transmit power allocated by the LTE eNB to the terminal is Plte, where Pnr+Plte<Ptotal, and Ptotal is total transmit power of the terminal. This ensures that a sum of the two pieces of transmit power is less than the total transmit power of the terminal when the terminal simultaneously sends uplink data to the NR gNB and the LTE eNB.

The other is a dynamic power allocation mechanism. The terminal allocates power based on power requirements of LTE uplink data and NR uplink data. For example, when the LTE uplink data requires relatively high power, relatively high power is allocated to the LTE uplink data. Therefore, in the dynamic power allocation mechanism, there is a case in which the terminal needs to simultaneously send uplink data to an NR gNB and an LTE eNB in a same time period, and both the uplink data sent to the NR gNB and the uplink data sent to the LTE eNB require relatively high transmit power, where Plte+Plte>Ptotal. In the conventional technology, when this case occurs, the terminal preferentially ensures the transmit power of the LTE uplink data, that is, preferentially allocates the transmit power to the LTE uplink data. In this case, the NR uplink data can be sent only at the remaining power. When the remaining power is insufficient to send the NR uplink data, the NR gNB cannot receive the NR uplink data, and cannot feed back downlink data to the terminal. Consequently, normal communication between the terminal and the NR gNB is affected.

For example, it is assumed that the total transmit power of the terminal is 23 dBm. In this case, if the terminal needs to send first uplink data over the link 1, 15 dBm transmit power is required. In addition, if the terminal sends second uplink data over the link 2, 15 dBm transmit power is required. Because the link 1 is an LTE link, transmit power of the LTE link is preferentially ensured in the conventional technology. Therefore, the terminal first allocates 15 dBm transmit power to the LTE link, where the remaining power is 8 dBm, and the terminal can allocate a maximum of 8 dBm transmit power to the link 2. In this case, there is no sufficient transmit power for the second uplink data on the link 2, and the second uplink data cannot be completely sent, and unsent data can only be retransmitted. If the second uplink data on the link 2 is relatively important uplink data and cannot be sent in time, execution of an important service of the terminal is affected.

The following describes an example of a scenario and a disadvantage of application of the conventional technology in this scenario: A user moves with a terminal (working in a DC mode). Serving base stations of the terminal at an original location include an NR gNB 1 and an LTE eNB 2. After the location is moved, the terminal moves out of a coverage area of the original NR gNB 1, and the terminal needs to be handed over to another NR gNB, for example, an NR gNB 2. Therefore, the terminal needs to send a handover request to the NR gNB 2. It is assumed that the terminal further needs to send LTE uplink data to the LTE eNB 1 when sending the handover request. According to the conventional technology, the terminal preferentially allocates transmit power to the LTE uplink data, and uses the remaining power to send the handover request. If the remaining power is insufficient, the terminal cannot complete handover from the NR gNB 1 to the NR gNB 2 in time, and communication between the terminal and the NR gNB is interrupted. Consequently, a service on an NR gNB side of the terminal is greatly affected. The foregoing scenario is merely an example. Problems similar to the foregoing problem may exist in another scenario in which NR uplink data and LTE uplink data are concurrent, and are not listed one by one in this application. In conclusion, in the conventional technology, a manner in which the terminal working in the DC mode preferentially allocates the transmit power to the LTE uplink data is improper, and has a disadvantage.

Figure 6:
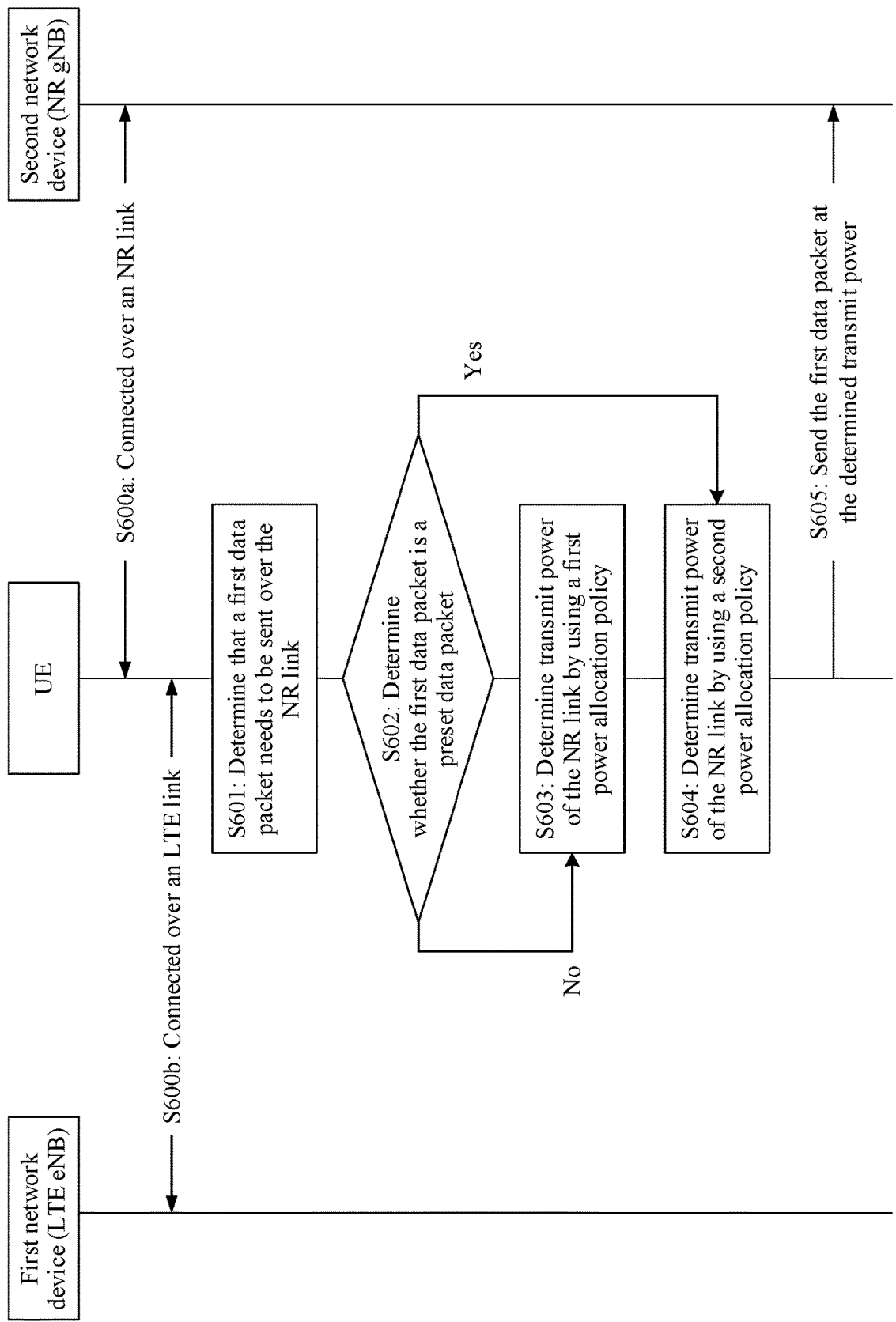
FIG. 6 is a schematic diagram of a transmit power control method according to an embodiment of this application.

Based on this, as shown in FIG. 6, an embodiment of this application provides a transmit power control method. Uplink data of a terminal is used as an example. Two power allocation policies are configured for the terminal. When determining that a data packet needs to be sent over an NR link, the terminal may determine, based on whether the data packet is a preset data packet, a to-be-used power allocation policy. Details are as follows:

Step 600: The terminal connects to an NR network device over an NR link and connects to an LTE network device over an LTE link.

The terminal is in a dual-connectivity network, that is, the terminal may perform data transmission over the LTE link and the NR link. A network identifier of a desktop of the terminal may display a 5G or 4G network identifier. For example, the network identifier is displayed in a status bar, and the status bar may further include power information and operator information.

Step 601: The terminal determines that a first data packet needs to be sent over the NR link.

Step 602: The terminal determines whether the first data packet is a preset data packet, and when the first data packet is a non-preset data packet, may perform step 603, or when a first application is a preset data packet, may perform step 604.

Step 603: When the terminal determines that the first data packet is a non-preset data packet, the terminal may allocate power to the NR link according to a first power allocation policy.

In some embodiments, the first power allocation policy means preferentially satisfying a transmit power requirement of the LTE link. The following describes the first power allocation policy in two cases.

Case 1: There is another data packet to be sent simultaneously with the first data packet, for example, a second data packet, and the second data packet needs to be sent over the LTE link. That is, when sending the first data packet over the NR link, the terminal sends the second data packet over the LTE link, and the two data packets are simultaneously sent on the corresponding links. In this case, a static allocation policy and a dynamic allocation policy may be included.

The static allocation policy means that transmit power of the NR link and transmit power of the LTE link are preconfigured by the terminal or the network, maximum transmit power of the LTE link is greater than maximum transmit power of the NR link, and a sum of the maximum transmit power of the NR link and the maximum transmit power of the LTE link is less than or equal to total transmit power. For example, the total transmit power of the terminal is 23 dBm, the maximum transmit power of the LTE link does not exceed 15 dBm, and the maximum transmit power of the NR link does not exceed 8 dBm. Assuming that the first data packet on the NR link requires 5 dBm transmit power that does not exceed 8 dBm, the terminal may allocate the 5 dBm transmit power to the NR link. It is assumed that the first data packet on the NR link requires 10 dBm transmit power. In this case, because the maximum transmit power of the NR link does not exceed 8 dBm, the terminal may allocate 8 dBm transmit power to the NR link. Therefore, the first data packet cannot be completely sent, and unsent data in the first data packet may be retransmitted. Similarly, assuming that the second data packet requires 10 dBm transmit power that does not exceed 15 dBm, the terminal may allocate the 10 dBm transmit power to the LTE link. It is assumed that the second data packet requires 16 dBm transmit power. In this case, because the maximum transmit power of the LTE link does not exceed 15 dBm, the terminal may allocate 15 dBm transmit power to the LTE link. Therefore, the second data packet cannot be completely sent, and unsent data in the second data packet may be retransmitted.

The dynamic allocation policy means that transmit power that can satisfy a transmit power requirement of the second data packet is preferentially allocated to the LTE link. Therefore, a higher transmit power requirement of the second data packet indicates higher transmit power allocated to the LTE link. Then, transmit power is allocated to the NR link in the remaining power for sending the first data packet. For example, it is assumed that the total transmit power of the terminal is 23 dBm, and the second data packet requires 15 dBm transmit power. Therefore, the terminal preferentially allocates the 15 dBm transmit power to the LTE link, where the remaining power is 8 dBm. If the first data packet requires 7 dBm transmit power, the 7 dBm transmit power is allocated to the NR link. If the first data packet requires 10 dBm transmit power, 8 dBm transmit power is allocated to the NR link. Therefore, the first data packet cannot be completely sent, and unsent data in the first data packet may be retransmitted. Therefore, in a scenario in which the NR link and the LTE link are concurrent, if a data packet sent over the NR link is not a preset data packet, sufficient transmit power is preferentially allocated to the LTE link.

Case 2: There is no other data packet to be sent simultaneously with the first data packet. That is, when the terminal sends the first data packet over the NR link, no data packet is sent on the LTE link. In this case, static power allocation and dynamic power allocation may be distinguished from each other, or static power allocation and dynamic power allocation may not be distinguished from each other. For example, only a dynamic power allocation mode is used, that is, transmit power that can satisfy a transmit power requirement of the first data packet is allocated to the NR link. Assuming that the first data packet requires 15 dBm transmit power, the terminal allocates the 15 dBm transmit power to the LTE link, and the remaining 8 dBm power may not be used, to implement power saving.

Step 604: When the terminal determines that the first data packet is a preset data packet, the terminal may allocate power to the NR link according to a second power allocation policy.

In some embodiments, the second power allocation policy means preferentially satisfying a transmit power requirement of the NR link. For example, the second power allocation policy may be increasing transmit power of the NR link. For example, assuming that the transmit power of the NR link in the first power allocation policy is first transmit power, for example, 8 dBm, and the transmit power of the NR link is increased to 15 dBm in the second power allocation policy, the maximum transmit power of the LTE link in the second power allocation policy does not exceed 8 dBm, to preferentially ensure the transmit power of the NR link. Specifically, a value to which the transmit power of the NR link is increased may be determined in a plurality of manners. For example, the transmit power of the NR link is increased to a preset value, for example, 15 dBm, and the preset value may be determined by default or in a protocol. Alternatively, the transmit power of the NR link needs to be increased to a value that can satisfy a transmit power requirement of the first data packet on the NR link. Assuming that the transmit power requirement of the first data packet is 10 dBm, the transmit power of the NR link needs to be increased to 10 dBm. Therefore, a higher transmit power requirement of the first data packet indicates higher transmit power of the NR link, to ensure that there is sufficient transmit power for the NR link.

In some embodiments, the second power allocation policy is relative to the first power allocation policy. The first power allocation policy may be set by default, or may comply with an existing standard protocol. The second power allocation policy needs to be enabled by the terminal, and after the policy is enabled, transmit power is preferentially allocated to the NR link.

The following describes the second power allocation policy in two cases. The two cases are similar to the foregoing two cases in the first power allocation policy.

Case 3: There is another data packet to be sent simultaneously with the first data packet, for example, a second data packet, and the second data packet needs to be sent over the LTE link. That is, when sending the first data packet over the NR link, the terminal sends the second data packet over the LTE link. Similarly, in this case, static power allocation and dynamic power allocation may also be included.

Different from the static power allocation in the foregoing first power allocation policy, in the static power allocation in the second power allocation policy, maximum transmit power of the NR link is greater than maximum transmit power of the LTE link, and a sum of the maximum transmit power of the NR link and the maximum transmit power of the LTE link is less than or equal to total transmit power. For example, the total transmit power of the terminal is 23 dBm, the maximum transmit power of the LTE link does not exceed 8 dBm, and the maximum transmit power of the NR link does not exceed 15 dBm, so as to preferentially ensure that there is sufficient transmit power for a data packet on the NR link. Assuming that the first data packet requires 10 dBm transmit power that does not exceed 15 dBm, the terminal may allocate the 10 dBm transmit power to the NR link. Assuming that the first data packet requires 16 dBm transmit power that does not exceed 15 dBm, the terminal may allocate 15 dBm transmit power to the NR link, and unsent data in the first data packet may be retransmitted. A same principle applies to the second data packet, and details are not described again.

Different from the dynamic allocation policy in the foregoing first power allocation policy, the dynamic allocation policy in the second power allocation policy means that transmit power that can satisfy a transmit power requirement of the first data packet is preferentially allocated to the NR link. Therefore, a higher transmit power requirement of the first data packet indicates higher transmit power allocated to the NR link. Then, transmit power is allocated to the LTE link in the remaining power for sending the second data packet. For example, it is assumed that the total transmit power of the terminal is 23 dBm, and the first data packet requires 15 dBm transmit power. Therefore, the terminal allocates the 15 dBm transmit power to the NR link, where the remaining power is 8 dBm. If the second data packet requires 7 dBm transmit power, the 7 dBm transmit power is allocated to the LTE link. If the second data packet requires 10 dBm transmit power, 8 dBm transmit power is allocated to the LTE link, and unsent data in the second data packet may be retransmitted. Therefore, in a scenario in which the NR link and the LTE link are concurrent, if a data packet sent over the NR link is a preset data packet, sufficient transmit power is preferentially allocated to the NR link.

Case 4: There is no other data packet to be sent simultaneously with the first data packet. A principle is the same as that in Case 2, and details are not described again.

Figure 7:
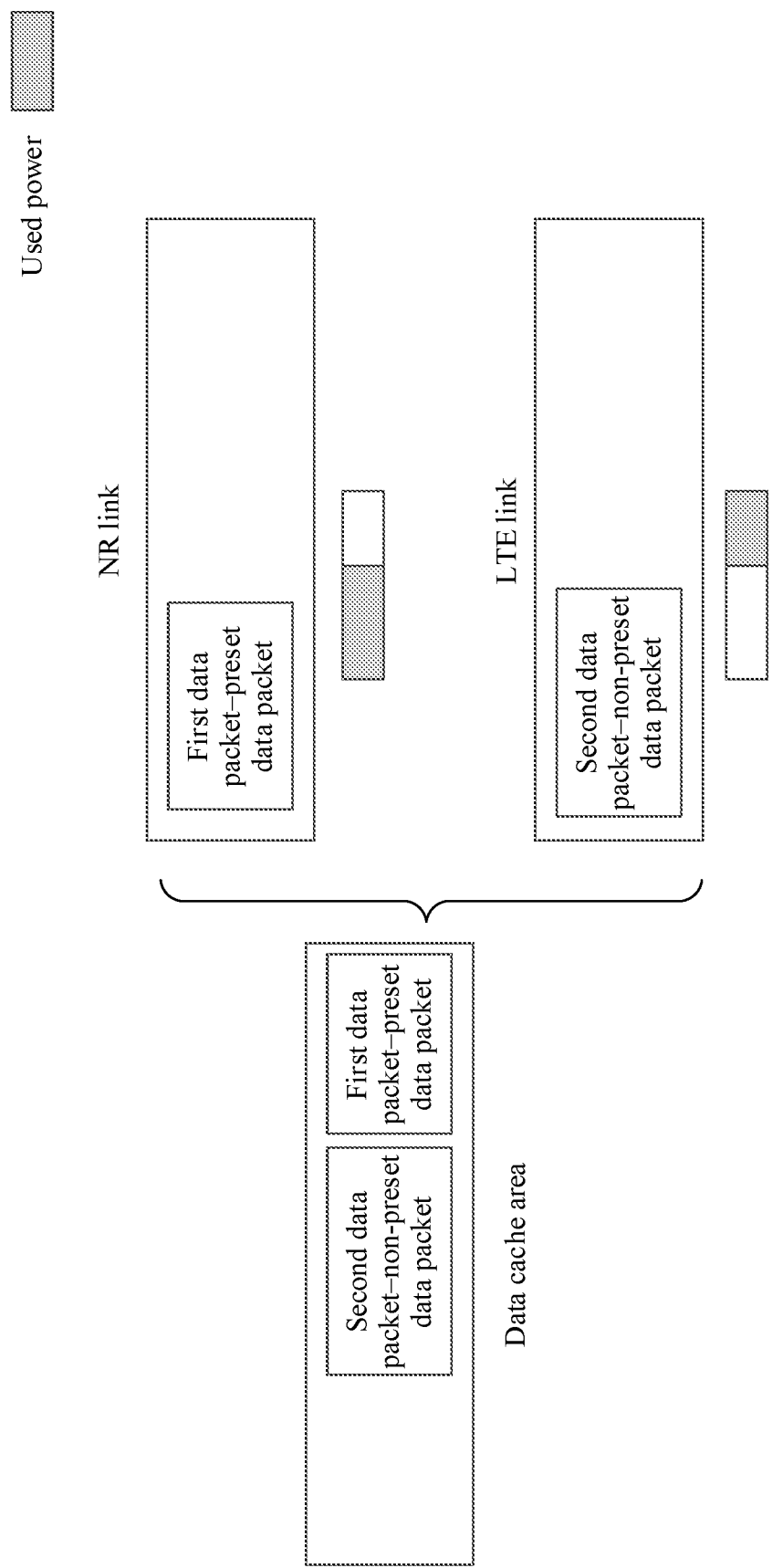
FIG. 7 is a schematic diagram of data sending according to a second power allocation policy according to an embodiment of this application.

For example, FIG. 7 is a schematic diagram of data sending according to the second power allocation policy. To be specific, when a data packet is sent by a PDCP layer entity, it may be determined whether the data packet is sent over the NR link or the LTE link. If the data packet sent over the NR link is a preset data packet, sufficient transmit power is allocated to the NR link to send the preset data packet. If the data packet sent over the LTE link is a non-preset data packet, specific transmit power is allocated to the LTE link in the remaining transmit power to send the non-preset data packet.

In the foregoing embodiment, the preset data packet may include a plurality of types of data packets.

Example 1: The preset data packet is an "important" data packet. In some embodiments, data that is "important" may be agreed on in a protocol. For example, uplink data that is "important" may be presented in a form of a list, for example, Table 1.

TABLE 1

| | |
|---|---|
| Important | NR PUCCH |
| Important | NR PRACH |
| Important | NR SRS |

It should be understood that the foregoing several types of important data are merely examples. In actual application, data that is "important" may further include more or less data than the foregoing data. Correspondingly, data that is not "important", for example, uplink data that is not in Table 1, is determined as unimportant data.

Example 2: A priority relationship between different uplink data may be pre-agreed on in a protocol, and the preset data packet may be a data packet whose priority is higher than a preset priority. The preset priority may be, for example, a priority 3 or a priority 4. The following provides an example of the priority relationship between different uplink data: Priority 1: LTE control information, for example, an LTE physical uplink control channel (Physical Uplink Shared Channel, PUCCH), a PRACH, or an SRS. Priority 2: NR PUCCH. Priority 3: NR physical random access channel (Physical Random Access Channel, PRACH). Priority 4: Sounding reference signal (Sounding Reference Signal, SRS). Priority 5: Other LTE information. Priority 6: Other NR information. It should be noted that the foregoing priority sequences are merely several examples, and priority sequences of all data are not listed one by one in this application.

Example 3: The preset data packet may be an uplink data packet generated by a preset application. The preset application may be an application set in advance, or an application specified by a user, or an application whose priority is higher than a preset priority. A sequence of priorities of different applications may be pre-agreed on. The following provides an example of a priority relationship between different applications: Priority 1: Voice call application. Priority 2: Video play application. Priority 3: Game application. Priority 4: Other communication applications. It should be noted that the foregoing priority sequences of different applications are merely several examples, and priority sequences of all applications are not listed one by one in this application.

Example 4: The preset data packet is a preset data packet generated in a preset scenario in a preset application. For descriptions of the preset application, refer to Example 3. The preset scenario may be a scenario whose priority is higher than a preset priority. For example, the preset application is a game application. The game application may include a battle scenario and a login scenario. A priority of the battle scenario is higher than a priority of the login scenario. The preset data packet may be a data packet generated in the battle scenario. A voice call application is used as an example. A priority of a video call scenario is higher than a priority of a voice call scenario, and the preset data packet may be a data packet generated in a common video scenario.

In this embodiment of this application, a policy of transmit power allocation between transmission channels (NR links or LTE links) in dual connectivity may be determined by determining whether a to-be-sent data packet is a preset data packet. Compared with a conventional transmit power allocation mode, this can ensure that the preset data packet is sent to the network in time, and avoid retransmission of the preset data packet as much as possible.

Figure 8:
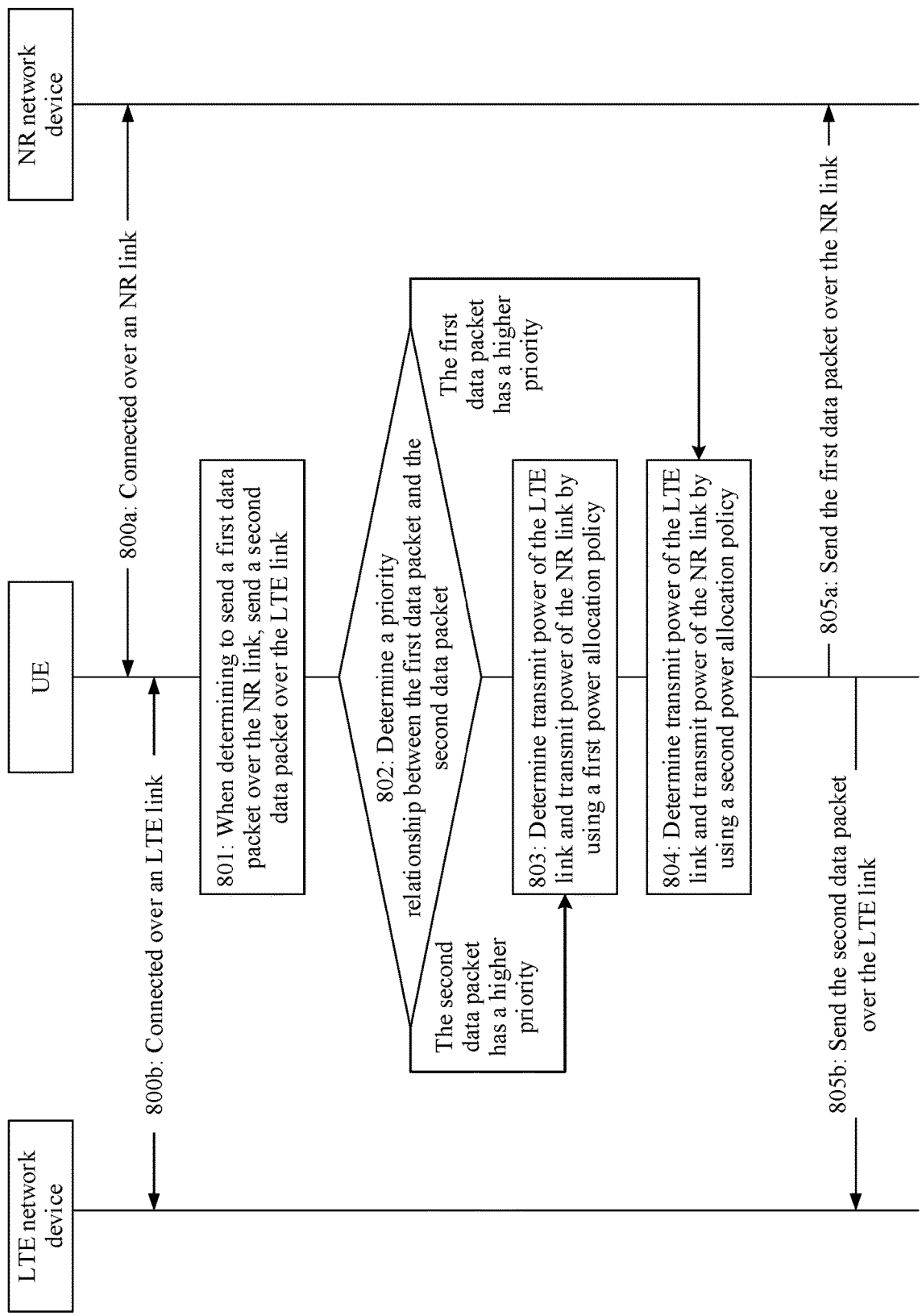
FIG. 8 is a schematic diagram of another transmit power control method according to an embodiment of this application.

As shown in FIG. 8, an embodiment of this application further provides another transmit power control method. For example, a terminal sends uplink data. In a scenario in which an NR link and an LTE link are concurrent, a suitable power allocation policy may be determined based on priorities of data packets on the NR link and the LTE link. Details are as follows:

Step 800: The terminal connects to an NR network device over an NR link and connects to an LTE network device over an LTE link.

Step 801: When determining to send a first data packet over the NR link, the terminal sends a second data packet over the LTE link.

Step 802: Determine a priority relationship between the first data packet and the second data packet, and when a priority of the second data packet is higher than a priority of the first data packet, perform step 803, or when the priority of the first data packet is higher than the priority of the second data packet, perform step 804.

Example 1: A priority relationship between different uplink data may be pre-agreed on in a protocol. For example, the priority relationship between different uplink data includes: Priority 1: LTE control information, for example, an LTE physical uplink control channel (Physical Uplink Shared Channel, PUCCH), a PRACH, or an SRS. Priority 2: NR PUCCH. Priority 3: NR physical random access channel (Physical Random Access Channel, PRACH). Priority 4: Sounding reference signal (Sounding Reference Signal, SRS). Priority 5: Other LTE information. Priority 6: Other NR information. The terminal may determine the priority relationship between the first data packet and the second data packet according to the foregoing priority relationship.

Example 2: Priorities of data packets may alternatively be determined based on priorities of applications corresponding to the data packets. For example, a data packet generated by an application with a higher priority has a higher priority, and a data packet generated by an application with a lower priority has a lower priority. For example, a priority relationship between different applications may be agreed on: Priority 1: Voice call application. Priority 2: Video play application. Priority 3: Game application. Priority 4: Other communication applications. It should be noted that the foregoing priority sequences of different applications are merely several examples, and priority sequences of all applications are not listed one by one in this application.

Example 3: A priority relationship between data packets of a same application may alternatively be determined based on a scenario. For example, in an application, a data packet generated in a scenario with a higher priority has a higher priority, and a data packet generated in a scenario with a lower priority has a lower priority. A game application is used as an example. The game application may include a battle scenario and a login scenario. A priority of the battle scenario is higher than a priority of the login scenario. Therefore, a priority of a data packet generated in the battle scenario is higher than a priority of a data packet generated in the login scenario. A voice call application is used as an example. A priority of a video call scenario is higher than a priority of a voice call scenario. Therefore, a priority of a data packet generated in the video call scenario is higher than a priority of a data packet generated in the voice call scenario.

Step 803: When the priority of the second data packet is higher than the priority of the first data packet, determine transmit power of the NR link and transmit power of the LTE link by using a first power allocation policy. The first power allocation policy mainly preferentially ensures a transmit power requirement of the LTE link. For the first power allocation policy, refer to the foregoing descriptions. Details are not described herein again.

Step 804: When the priority of the first data packet is higher than the priority of the second data packet, determine transmit power of the NR link and transmit power of the LTE link by using a second power allocation policy. The second power allocation policy mainly preferentially ensures a transmit power requirement of the NR link. For the second power allocation policy, refer to the foregoing descriptions. Details are not described herein again.

In this embodiment of this application, when there is a requirement for concurrency between the NR link and the LTE link, a power allocation mode may be determined by determining a priority relationship between data packets on the NR link and the LTE link, to preferentially ensure that there is sufficient power for sending a data packet with a higher priority, thereby avoiding retransmission.

Figure 9:
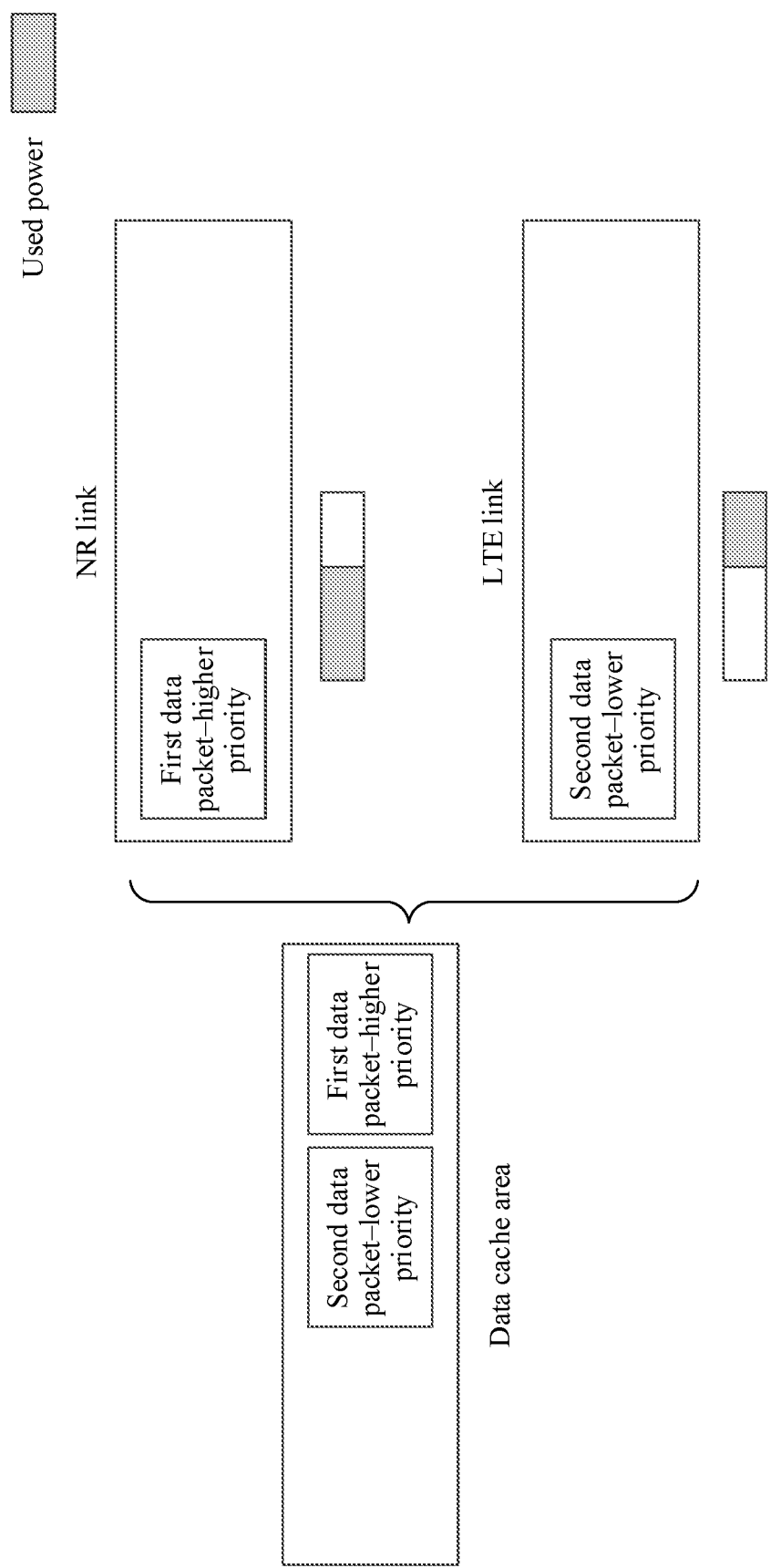
FIG. 9 is another schematic diagram of data sending according to a second power allocation policy according to an embodiment of this application.

For example, FIG. 9 is another schematic diagram of data sending according to the second power allocation policy. To be specific, when a data packet is sent by a PDCP layer entity, it is determined whether the data packet is sent over the NR link or the LTE link. If the first data packet is sent over the NR link, and the second data packet is sent over the LTE link, the priority relationship between the first data packet and the second data packet is determined, and a mode for allocating transmit power to the NR link and allocating transmit power to the LTE link is determined. Specifically, if the first data packet has a higher priority, the second power allocation policy is used; or if the second data packet has a higher priority, the first power allocation policy is used.

In some other embodiments, when there is a requirement for concurrency between the NR link and the LTE link, the terminal allocates transmit power to the NR link according to the second power allocation policy. If the remaining power does not satisfy the transmit power requirement of the LTE link, the terminal may send prompt information to the LTE network device. The prompt information may be used to indicate that transmit power of the second data packet is insufficient. Optionally, the prompt information may indicate a resource location of the first data packet on the NR link, so that the LTE network device adjusts a resource location of the second data packet, and indicates an adjusted resource location of the second data packet to the terminal. The resource location of the second data packet does not overlap the resource location of the first data packet, for example, time-frequency resources do not overlap. The terminal sends the second data packet based on the adjusted resource location of the second data packet, to avoid concurrency with the first data packet and insufficient transmit power allocation.

In some other embodiments, the terminal does not need to determine whether to use the first power allocation policy or the second power allocation policy. For example, the network may notify the terminal to use the first power allocation policy or the second power allocation policy.

Figure 10:
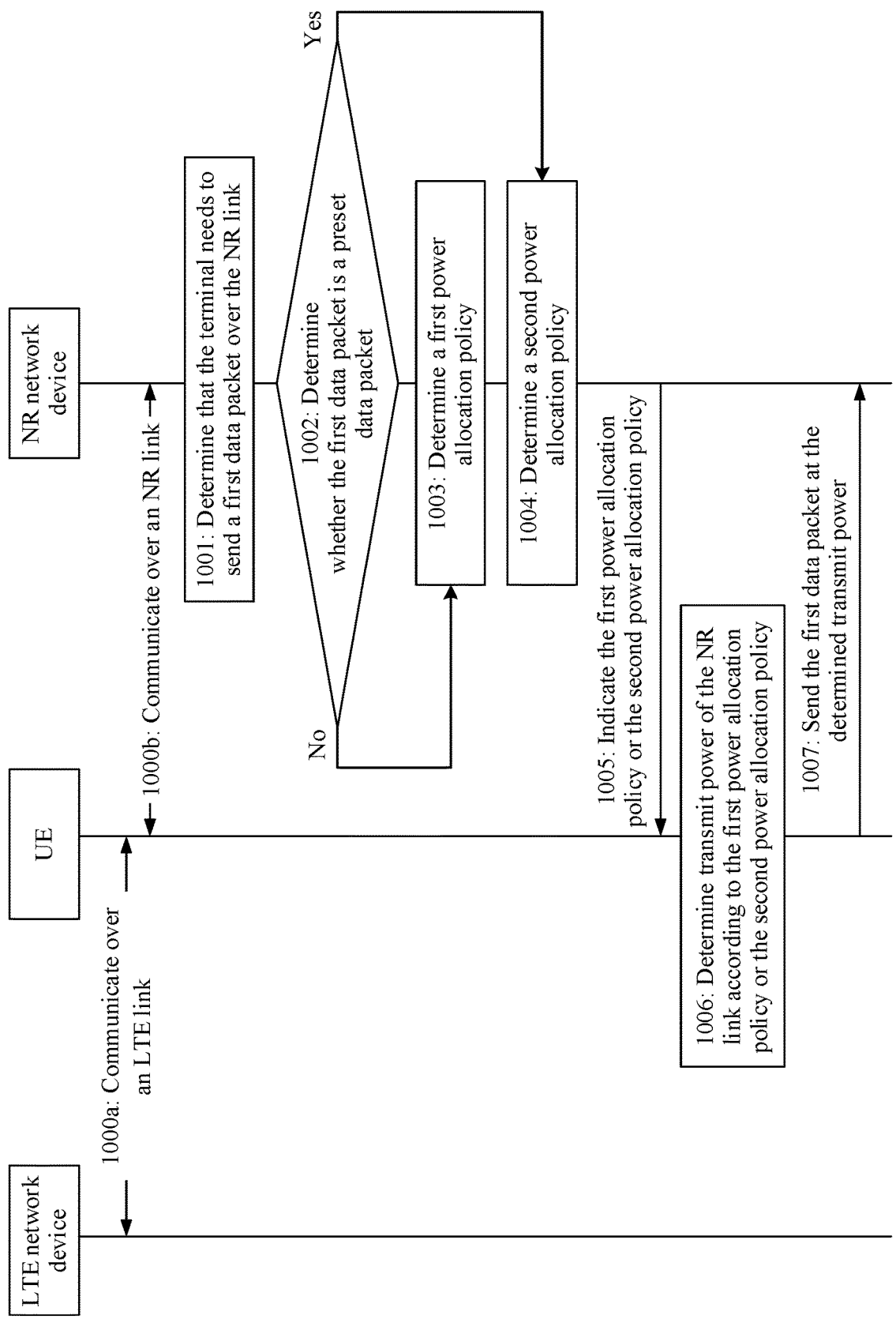
FIG. 10 is a schematic diagram of still another transmit power control method according to an embodiment of this application.

FIG. 10 shows a transmit power control method according to an embodiment of this application. In the method, a network side determines whether to use a first power allocation policy or a second power allocation policy, and then notifies a terminal. Details are as follows:

Step 1000: The terminal connects to an NR network device over an NR link and connects to an LTE network device over an LTE link.

Step 1001: The NR network device determines that the terminal needs to send a first data packet over the NR link.

Step 1002: The NR network device determines whether the first data packet is a preset data packet, and when determining that the first data packet is a preset data packet, may perform step 1003, or when determining that the first data packet is a non-preset data packet, may perform step 1004.

Step 1003: The NR network device determines to use a first power allocation policy.

Step 1004: The NR network device determines to use a second power allocation policy.

Step 1005: When determining to use the first power allocation policy, the NR network device notifies the terminal to use the first power allocation policy, or when determining to use the second power allocation policy, the NR network device notifies the terminal to use the second power allocation policy.

Step 1006: When the NR network device notifies the terminal to use the first power allocation policy, the terminal determines transmit power of the NR link according to the first power allocation policy, or when the NR network device notifies the terminal to use the second power allocation policy, the terminal determines transmit power of the NR link according to the second power allocation policy.

Step 1007: The UE sends the first data packet to the NR network device at the determined transmit power.

In the embodiment shown in FIG. 10, the NR network device indicates a power allocation policy, and the terminal does not need to determine a to-be-used power allocation policy. This helps reduce power consumption of the terminal. It should be noted that, in some other embodiments, step 1001 to step 1005 performed by the NR network device in FIG. 10 may alternatively be performed by the LTE network device. Details are not described herein again.

In the embodiment shown in FIG. 10, there may be a variant solution. For example, the terminal uses the first power allocation policy by default. When determining that the first data packet is a preset data packet in step 1002, the NR network device notifies the terminal to use the second power allocation policy. When determining that the first data packet is a non-preset data packet in step 1002, the NR network device does not need to notify the terminal to use the first power allocation policy.

In the foregoing embodiment, the terminal uses a plurality of power allocation policies. The following describes another embodiment. In this embodiment, the terminal has only one power allocation policy, that is, the first power allocation policy.

Figure 11:
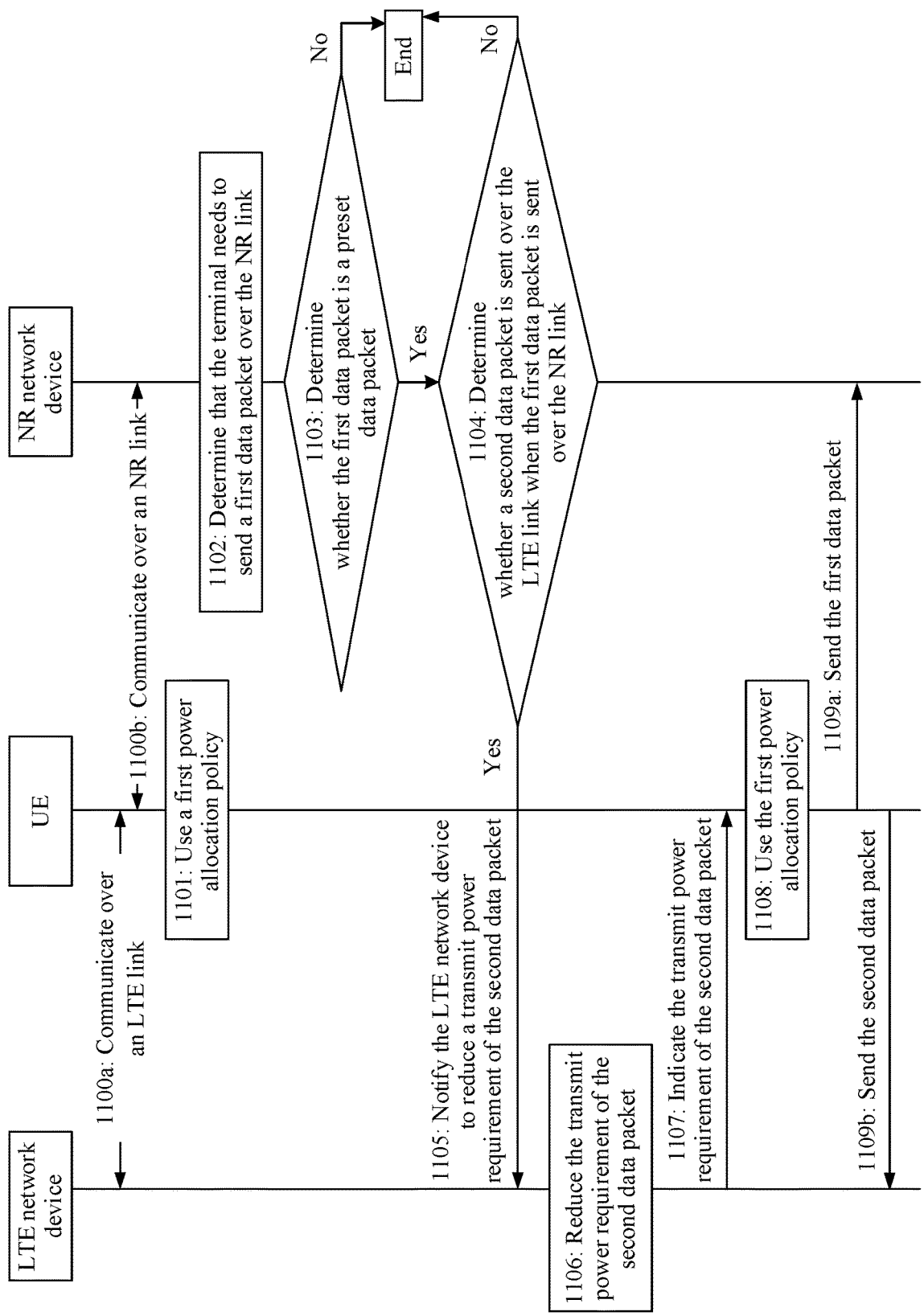
FIG. 11 is a schematic diagram of still another transmit power control method according to an embodiment of this application.

FIG. 11 shows still another power allocation method according to an embodiment of this application. In the method, a terminal has only a first power allocation policy. Details are as follows:

Step 1100: The terminal communicates with an NR network device over an NR link and communicates with an LTE network device over an LTE link.

Step 1101: The terminal allocates transmit power to the NR link and allocates transmit power to the LTE link by using a first power allocation policy.

The first power allocation policy herein means preferentially allocating sufficient power to the LTE link. This is described above, and details are not described again.

Step 1102: The NR network device determines that the terminal needs to send a first data packet over the NR link.

Step 1103: The NR network device determines whether the first data packet is a preset data packet, and when determining that the first data packet is a preset data packet, may perform step 1104, or when determining that the first data packet is a non-preset data packet, may end the procedure.

Step 1104: The NR network device determines whether a second data packet is sent over the LTE link when the first data packet is sent over the NR link, and if the NR network device determines that the second data packet is sent over the LTE link when the first data packet is sent over the NR link, may perform step 1105, or if the NR network device determines that the second data packet is not sent over the LTE link when the first data packet is sent over the NR link, may end the procedure.

Step 1105: The NR network device notifies the LTE network device to reduce a transmit power requirement of the second data packet.

Optionally, the NR network device may send first indication information to the LTE network device. The first indication information indicates the LTE network device to reduce the transmit power requirement of the second data packet, or indicates that the first data packet is a preset data packet.

Optionally, before notifying the LTE network device to reduce the transmit power requirement of the second data packet, the NR network device may further perform determining, for example, determine whether a total transmit power requirement of the first data packet and the second data packet is greater than total transmit power of the terminal, or determine whether the remaining transmit power obtained by subtracting the transmit power requirement of the second data packet from total transmit power of the terminal is greater than or equal to a transmit power requirement of the first data packet. The terminal configures only the first power allocation policy, preferentially allocates transmit power to the LTE link, and allocates transmit power to the NR link in the remaining power. Therefore, in a scenario in which data packets on the NR link and the LTE link are concurrent, if the total transmit power requirement of the second data packet on the LTE link and the first data packet on the NR link is less than or equal to the total transmit power of the terminal, the NR network device does not need to notify the LTE network device to reduce the transmit power requirement, or if the total transmit power requirement of the second data packet on the LTE link and the first data packet on the NR link is greater than the total transmit power of the terminal, the NR network device notifies the LTE network device to reduce the transmit power requirement of the second data packet. For example, if the transmit power requirement of the first data packet is 10 dBm, the transmit power requirement of the second data packet is 10 dBm, and the total power of the terminal is 23 dBm, the NR network device does not need to notify the LTE network device to reduce the transmit power requirement of the second data packet. Assuming that the transmit power requirement of the first data packet is 15 dBm, the transmit power requirement of the second data packet is 10 dBm, and the total power of the terminal is 23 dBm, the NR network device needs to notify the LTE network device to reduce the transmit power requirement of the second data packet. Otherwise, the terminal preferentially allocates 10 dBm transmit power to the LTE link, and the remaining power does not satisfy a transmit power requirement of the NR link.

Step 1106: The LTE network device reduces the transmit power requirement of the second data packet.

In some embodiments, the transmit power requirement of the second data packet is reduced to a preset value, and the preset value may be set by default or determined in a protocol. Alternatively, a reduction amount is indicated by the NR network device. For example, the NR network device indicates the transmit power requirement of the first data packet to the LTE network device. Assuming that the transmit power requirement of the first data packet is 15 dBm, and the total transmit power of the terminal is 23 dBm, the LTE network device reduces transmit power of the second data packet to a value less than or equal to 8 dBm. In this way, the terminal first allocates 8 dBm transmit power to the LTE link by using the first power allocation policy, where the remaining power is 15 dBm, and allocates 15 dBm transmit power to the NR link to send the first data packet, so that the transmit power requirement of the first data packet can be satisfied.

The transmit power requirement of the first data packet or the second data packet may be calculated according to a formula specified in the protocol. That the second data packet is an SRS data packet is used as an example. A formula for calculating transmit power of the SRS data packet in the protocol is as follows:

$$P_{SRS,b,f,c}(i, q_s, l) = \min\left\{\begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{array}\right\}[dBm].$$

Herein, b is a BWP occupied for SRS channel transmission, f is a carrier occupied for SRS channel transmission, c is a serving cell in which the carrier is located, i is a transmit opportunity window index, $q_s$ is an SRS resource index, l is a power control adjustment status, $P_{SRS,b,f,c}(i,q_s,l)$ represents SRS transmit power on the BWP b of the carrier f of the cell c, $P_{CMAX,f,c}(i)$ represents maximum transmit power of the terminal device on the carrier f of the cell c, $P_{O\_SRS,b,f,c}(q_s)$ represents open-loop power of an SRS channel on the BWP b of the carrier f of the cell c, $M_{SRS,b,f,c}(i)$ represents a bandwidth (represented by a quantity of RBs) of the SRS channel on the BWP b of the carrier f of the cell c, μ is a subcarrier spacing, where when μ=0, a corresponding subcarrier spacing is 15 kHz, and a relationship between μ and a subcarrier spacing is specified in the protocol, $PL_{b,f,c}(q_d)$ represents a path loss on the BWP b of the carrier f of the cell c, $\alpha_{SRS,b,f,c}(q_s)$ represents a path loss compensation factor corresponding to the SRS resource $q_s$ on the BWP b of the carrier f of the cell c, $h_{b,f,c}(i)$ represents a closed-loop power control adjustment value (referred to as a closed-loop power control adjustment value for short) on the BWP b of the carrier f of the cell c, and represents a power control dynamic offset part, which may be determined according to a TPC indication carried in DCI.

Therefore, to reduce the transmit power requirement of the second data packet, values of some or all parameters (referred to as power control parameters for short) in the foregoing formula may be reduced, for example, a value of $M_{SRS,b,f,c}(i)$ or $h_{b,f,c}(i)$ is reduced. In this way, the calculated power requirement of the second data packet is reduced.

Step 1107: The LTE network device notifies the terminal of the transmit power requirement of the second data packet.

In some embodiments, after obtaining a reduced transmit power requirement of the second data packet by using the foregoing formula, the LTE network device notifies the terminal of the reduced transmit power requirement of the second data packet. In some other embodiments, the LTE network device may alternatively send the power control parameter in the foregoing formula to the terminal, and the terminal performs calculation by using the foregoing formula. Because the power control parameter sent by the LTE network device to the terminal is reduced, the transmit power requirement of the second data packet that is calculated by the terminal by using the foregoing formula is a reduced transmit power requirement.

Step 1108: The terminal allocates the transmit power to the NR link and allocates the transmit power to the LTE link by using the first power allocation policy.

The first power allocation policy herein means preferentially allocating sufficient transmit power to the LTE link. This is described above, and details are not described again.

It should be understood that the terminal preferentially ensures that sufficient transmit power is allocated to the LTE link, and transmit power of the NR link can be determined only from the remaining power obtained after the transmit power is allocated to the LTE link. Because the transmit power requirement of the second data packet on the LTE link is reduced, the remaining power obtained after the transmit power is allocated to the LTE link is increased correspondingly, to ensure as much as possible that there is sufficient transmit power for the NR link. For example, the original transmit power requirement of the first data packet on the NR link is 15 dBm, and the transmit power requirement of the second data packet on the LTE link is 15 dBm. Because the first data packet is a preset data packet, it is necessary to ensure that there is sufficient transmit power for the first data packet, and the LTE network device reduces the transmit power requirement of the second data packet from 15 dBm to 8 dBm. Therefore, when executing the first power allocation policy to allocate the transmit power to the NR link and allocate the transmit power to the LTE link, the terminal first allocates 8 dBm transmit power to the LTE link for sending the second data packet, where the remaining power is 15 dBm, and allocates 15 dBm transmit power to the NR link in the remaining power for sending the first data packet. Therefore, in this embodiment, even if the terminal uses the first power allocation policy, it can be ensured that there is sufficient transmit power for the preset data packet on the NR link.

Step 1109: The terminal sends the first data packet to the NR network device at the transmit power of the NR link that is determined according to the first power allocation policy, and sends the second data packet to the LTE network device at the transmit power of the LTE link that is determined according to the first power allocation policy.

In this embodiment of this application, the terminal may configure only the first power allocation policy. When a network side (the NR network device and the LTE network device) determines a scenario in which data packets of the terminal on the NR link and the LTE link are concurrent, if the data packet on the NR link is a preset data packet, the network side may reduce a transmit power requirement of the data packet on the LTE link, so that the remaining power obtained after the terminal allocates transmit power to the LTE link by using the first power configuration policy can still satisfy a transmit power requirement of the preset data packet on the NR link. This embodiment imposes a relatively low requirement on the terminal, and is relatively easy to implement on a terminal side.

Figure 12:
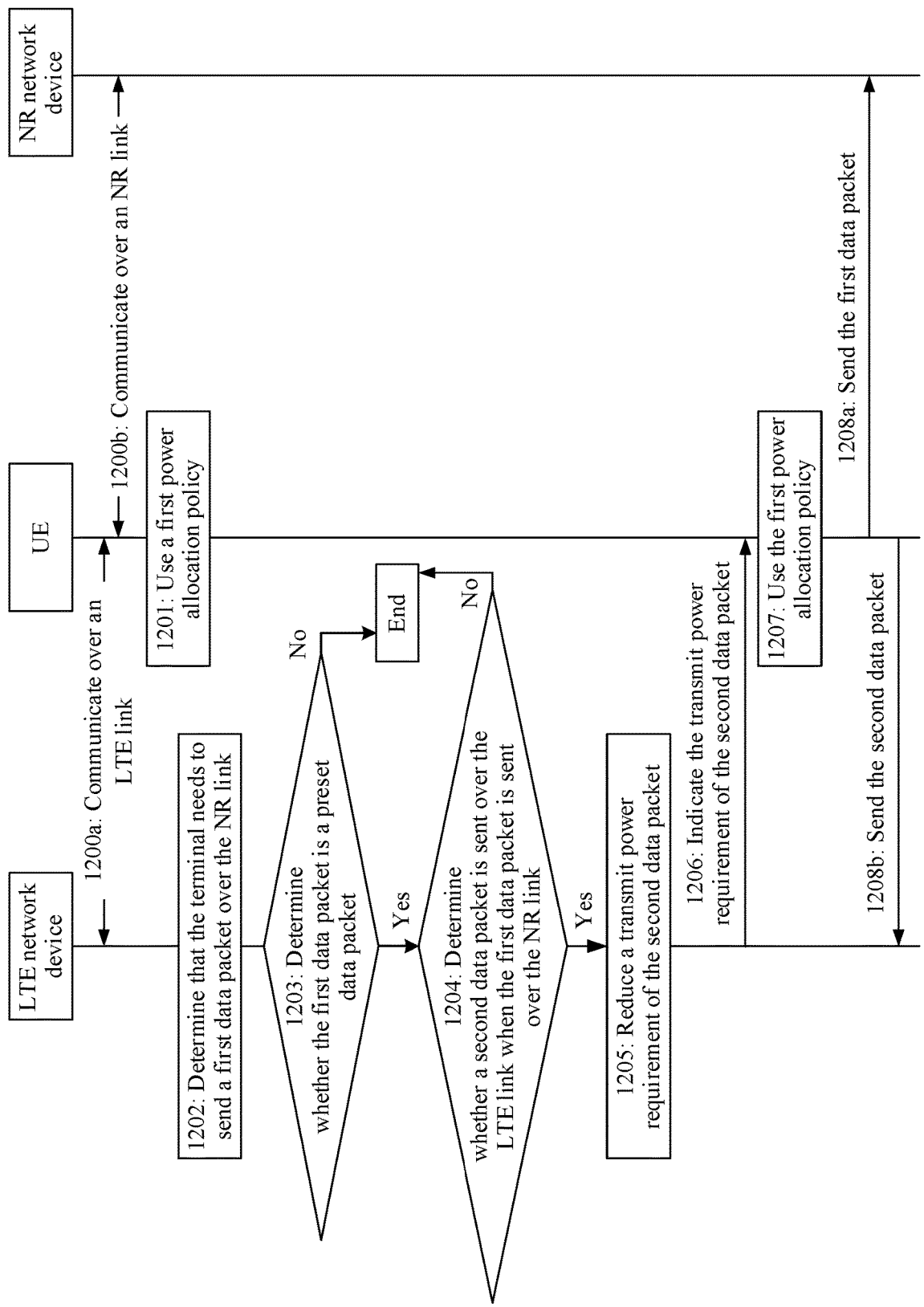
FIG. 12 is a schematic diagram of still another transmit power control method according to an embodiment of this application.

The embodiment shown in FIG. 11 further has the following variant embodiment. FIG. 12 shows still another transmit power control method according to an embodiment of this application. Details are as follows:

Step 1200: The terminal communicates with an NR network device over an NR link and communicates with an LTE network device over an LTE link.

Step 1201: The terminal allocates transmit power to the NR link and allocates transmit power to the LTE link by using a first power allocation policy.

Step 1202: The LTE network device determines that the terminal needs to send a first data packet over the NR link.

Step 1203: The LTE network device determines whether the first data packet is a preset data packet, and when determining that the first data packet is a preset data packet, may perform step 1204, or when determining that the first data packet is not a preset data packet, may end the procedure.

Step 1204: The LTE network device determines whether the terminal sends a second data packet over the LTE link when sending the first data packet over the NR link, and if the LTE network device determines that the terminal needs to send the second data packet over the LTE link when sending the first data packet over the NR link, may perform step 1205, or if the LTE network device determines that the terminal does not need to send the second data packet over the LTE link when sending the first data packet over the NR link, may end the procedure.

Step 1205: The LTE network device reduces a transmit power requirement of the second data packet.

For descriptions of step 1206 to step 1208, refer to the embodiment shown in FIG. 11.

Different from the embodiment shown in FIG. 11 in which the NR network device notifies the LTE network device to reduce the transmit power requirement of the second data packet, in this embodiment, the LTE network device determines whether the first data packet sent by the terminal on the NR link is a preset data packet, and if yes, sends the second data packet on the LTE link when determining that the terminal sends the first data packet on the NR link. The LTE network device reduces the transmit power requirement of the second data packet.

Figure 13:
FIG. 13 is a schematic diagram of a software architecture of a terminal according to an embodiment of this application.
Figure 13:
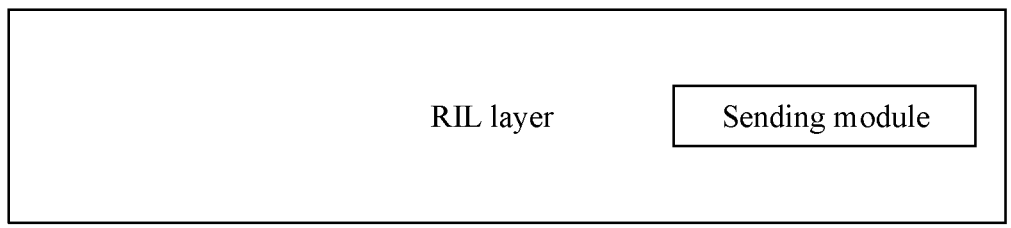
Figure 13:
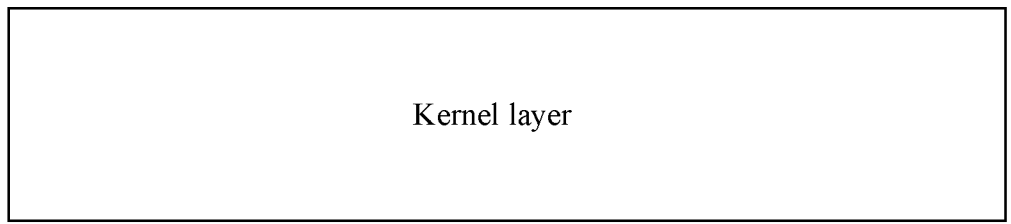
Figure 13:
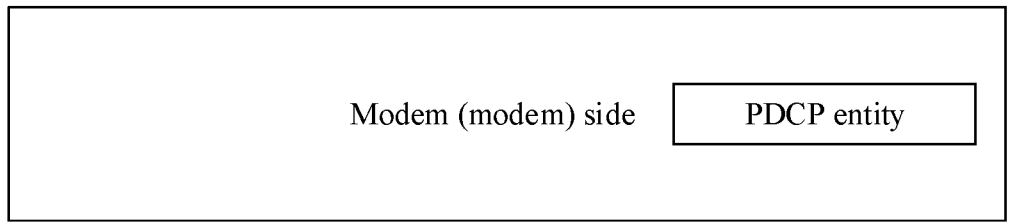

An embodiment of this application further provides a schematic diagram of an architecture of a terminal for implementing the foregoing embodiments. As shown in FIG. 13, a software architecture of the terminal may include an application layer, an RIL layer, a kernel kernel layer, and a modern side.

The application layer includes various applications, for example, a Phone application, a WeChat application, and a Messages application. The application layer further includes an identification module. The identification module is mainly configured to identify a current application, for example, identify the application by listening to a package name or an activity activity of the application.

The RIL layer is an interface layer between the application layer and a physical layer, and is mainly configured to transmit control plane data.

The kernel layer is mainly configured to configure a power allocation policy. For example, after receiving a data packet from the application layer, the kernel layer may identify whether the data is a preset data packet. Generally, the application layer can identify only a type of an application or an activity, and cannot identify a type of a data packet related to the application. In this case, the kernel layer needs to identify the type of the packet, and label the corresponding data packet. For example, an acc_stat field of an ock structure may be used for definition. When any bit in the field is 1, it may indicate that the data packet is a preset data packet, a second power allocation policy needs to be enabled, and the field is sent to a modem together with the data packet. For example, when any bit in the field is set to 0, it may indicate that the data packet is not a preset data packet, the second power allocation policy does not need to be enabled, and a first power configuration policy is used.

The modem side is mainly configured to execute the first power allocation policy or the second power allocation policy. The modem may use the first power allocation policy by default, and determine, based on an upper-layer condition, whether to enable the second power allocation policy, for example, determine, by using a flag bit in the acc_stat field, whether to enable the second power allocation policy.

An embodiment of this application further provides a chip system. A system chip 1000 shown in FIG. 14 includes an application processor 1002 (application processor, AP) and a baseband processor 1004 (baseband processor, BP). A full name of the application processor is a multimedia application processor (multimedia application processor, MAP), which is an ultra-large-scale integrated circuit that extends audio and video functions and a dedicated interface based on a low-power central processing unit CPU. The application processor is mainly classified into three types: a comprehensive processor, a multimedia processor, and a single media processor. The comprehensive processor not only needs to have a function of the multimedia application processor, but also can run a complex operating system such as Linux. The multimedia processor is a processor that processes more than two media, for example, media such as an image, a sound, a video, and a 3D graphics. The single multimedia processor is a processor that processes one medium, and is usually configured only to process an image or a sound.

The baseband processor is an important component in the system chip, is equivalent to a protocol processor, is responsible for data processing and storage, and mainly includes units such as a digital signal processor (digital signal processor, DSP), a micro controller unit (micro controller unit, MCU), and a memory (such as a flash or a flash memory). Corresponding main functions of the baseband processor are responsible for baseband encoding or decoding, sound encoding, voice encoding, and the like. Currently, the baseband processor not only supports a plurality of communications standards (for example, GSM, LTE, and CDMA), but also provides a multimedia function and a communications interface related to a multimedia display, an image sensor, and an audio device.

In actual application, software that can be run by the application processor AP generally includes an operating system, a user interface, an application, and the like. The baseband processor BP may be considered as a wireless modem modem module, and is responsible for coordinating and controlling communication between the BP and a base station and between the BP and the AP. Software that can be run by the baseband processor includes communication control software of the baseband modem baseband modem, and the like.

A preset interface technology can be used to implement mutual communication between the application processor AP and the baseband processor BP. The interface technology may be customized in a system. For example, the interface technology includes but is not limited to an interface technology such as a serial peripheral interface (serial peripheral interface, SPI), a universal asynchronous receiver/transmitter (universal asynchronous receiver/transmitter, UART) interface, a universal serial bus (universal serial bus, USB) interface, or a general-purpose input/output (general-purpose input/output, GPIO) interface. Specifically, communication transmission between the application processor and the baseband processor may be implemented in a message format by using a control command, to complete functions such as a call, an SMS message, and mobile network access. The control command may include a conventional AT (attention) command, a mobile broadband interface mode (mobile broadband interface model, MBIM) command, another protocol command that supports mutual transmission between the AP and the BP, or the like.

Figure 14:
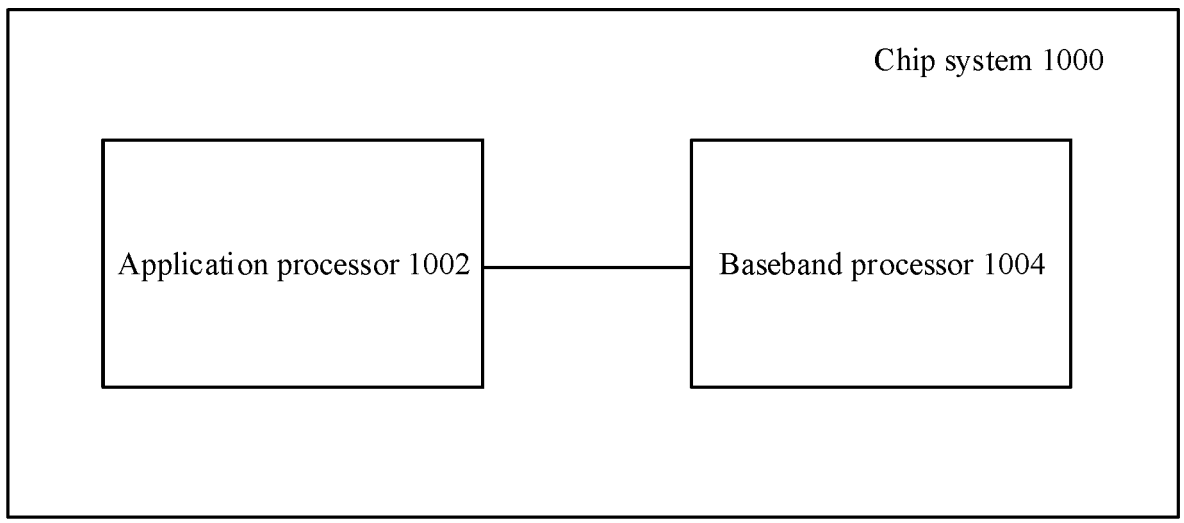
FIG. 14 is a schematic diagram of a chip system according to an embodiment of this application.

Optionally, as shown in FIG. 14, the baseband processor BP can run protocol software related to a non-access stratum NAS layer and a radio resource control RRC layer. In actual application, the application processor AP can communicate with the NAS layer and the RRC layer in the baseband processor BP. For example, in this application, the application processor AP may send a corresponding signaling message to the NAS by using the conventional AT command, to notify the NAS layer of information such as an application status or a device screen status that is learned by the current AP.

In actual application, the system chip 14 is generally a highly complex system chip, for example, an SOC chip. During actual deployment, the system chip 1000 may be deployed inside a device, or may be deployed outside the device. The device is controlled by using a wired connection or a wireless connection. The device includes but is not limited to user equipment UE or a terminal device. For example, the device may specifically include a smartphone, a mobile internet device (mobile internet device, MID), a wearable intelligent device, or another device that supports network communication. Specifically, when the system chip 1000 is deployed inside the user equipment, the system chip 1000 is directly configured to implement the method described in any one of the method embodiments shown in FIG. 1 to FIG. 13. When the system chip 1000 is deployed outside the user equipment, and can establish communication between the system chip 1000 and the user equipment by using a wired connection or a wireless connection, the user equipment invokes or controls the system chip 1000 to implement the method described in any one of the method embodiments shown in FIG. 1 to FIG. 13.

For example, the application processor is configured to: run an application in response to a user operation to generate a first data packet, and send the first data packet to the baseband processor. The baseband processor receives the first data packet, and determines whether the first data packet is sent over an NR link or an LTE link. If the first data packet is sent over the NR link, the baseband processor determines whether the first data packet is a preset data packet, and if yes, increases transmit power of the NR link to send the first data packet at increased transmit power over the NR link. It is assumed that the application processor generates a second data packet and sends the second data packet to the baseband processor. In this case, the baseband processor determines that the second data packet is sent over the LTE link, and determines that transmit power of the LTE link is third transmit power, where a sum of the third transmit power and the increased transmit power of the NR link is less than or equal to total transmit power of the terminal. The baseband processor sends the second data packet at the third transmit power over the LTE link.

Figure 15:
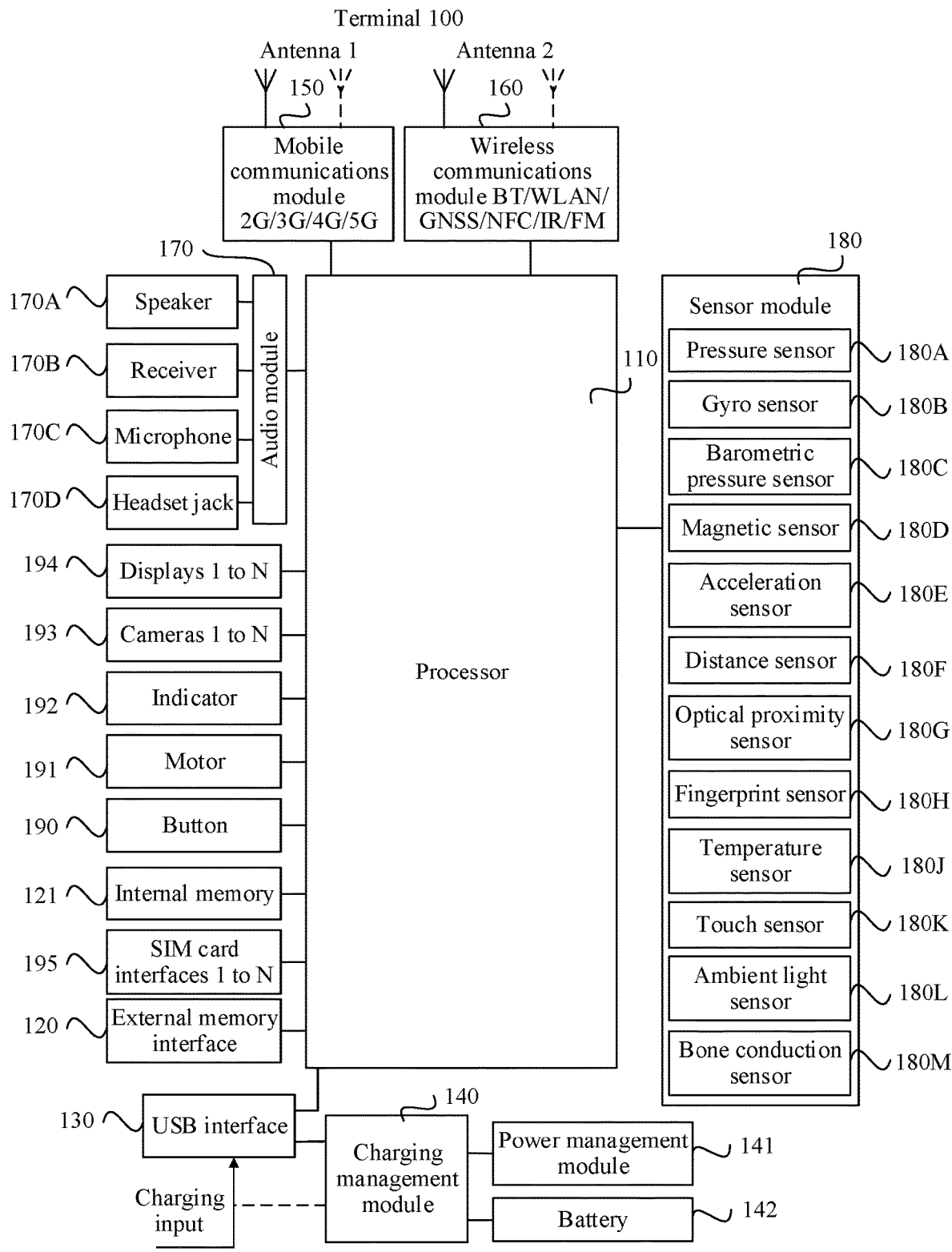
FIG. 15 is a schematic diagram of a structure of a terminal according to an embodiment of this application.

FIG. 15 is a schematic diagram of a structure of a terminal according to an embodiment of this application.

A terminal 100 is used as an example below to describe embodiments in detail. It should be understood that the terminal 100 shown in FIG. 15 is merely an example, and the terminal 100 may have more or fewer components than those shown in FIG. 15, may combine two or more components, or may have different component configurations. Components shown in the figure may be implemented by hardware, software, or a combination of hardware and software that includes one or more signal processing and/or application-specific integrated circuits.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the terminal 100, or may be configured to transmit data between the terminal 100 and a peripheral device, or may be configured to connect to a headset for playing audio through the headset. The interface may be further configured to connect to another terminal such as an AR device.

It may be understood that an interface connection relationship between the modules in this embodiment of the present invention is merely an example for description, and does not constitute a limitation on the structure of the terminal 100. In some other embodiments of this application, the terminal 100 may alternatively use an interface connection manner different from that in the foregoing embodiment, or may use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the terminal 100. The charging management module 140 may further supply power to the terminal by using the power management module 141 while charging the battery 142.

The power management module 141 is configured to connect to the battery 142, the charging management module 140, and the processor 110. The power management module 141 receives an input of the battery 142 and/or an input of the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may be alternatively disposed in a same component.

A wireless communication function of the terminal 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the terminal 100, to wireless communication including 2G/3G/4G/5G or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the terminal 100, for wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more devices integrating at least one communication processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 implements a display function through the GPU, the display 194, the application processor, and the like. The GPU is a microprocessor for image processing, and connects the display 194 to the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal 100 may include one or N displays 194, where N is a positive integer greater than 1.

The terminal 100 may implement a photographing function through the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the terminal 100, such as image recognition, facial recognition, speech recognition, and text understanding.

The external memory interface 120 may be configured to connect to an external memory card, for example, a micro SD card, to extend a storage capability of the terminal 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a voice playing function or an image playing function), and the like. The data storage area may store data (for example, audio data and a phone book) and the like created when the terminal 100 is used. In addition, the internal memory 121 may include a high-speed random access memory, and may further include a nonvolatile memory, for example, at least one magnetic disk storage device, a flash memory, or a universal flash storage (universal flash storage, UFS).

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The terminal 100 may listen to music or answer a call in a hands-free mode by using the speaker 170A.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating an SMS message is performed.

The gyro sensor 180B may be configured to determine a moving posture of the terminal 100. In some embodiments, angular velocities of the terminal 100 around three axes (namely, x, y, and z axes) may be determined by using the gyro sensor 180B. The gyro sensor 180B may be configured to implement image stabilization during photographing. For example, when the shutter is opened, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyro sensor 180B may also be used in a navigation scenario and a somatic game scenario.

The barometric pressure sensor 180C is configured to measure barometric pressure. In some embodiments, the terminal 100 calculates an altitude by using a barometric pressure value measured by the barometric pressure sensor 180C, to assist positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations of the terminal 100 in various directions (usually on three axes). When the terminal 100 is still, a value and a direction of gravity may be detected. The acceleration sensor 180E may be further configured to recognize a posture of a terminal, and is applied in an application such as a pedometer or screen switching between a landscape mode and a portrait mode.

The distance sensor 180F is configured to measure a distance. The terminal 100 may measure a distance through infrared light or a laser. In some embodiments, the terminal 100 may use the distance sensor 180F to measure a distance, to implement fast focusing in a photographing scenario.

The optical proximity sensor 180G may include, for example, a light emitting diode (LED) and an optical detector, for example, a photodiode. The light emitting diode may be an infrared light emitting diode. The terminal 100 emits infrared light by using the light emitting diode. The terminal 100 detects infrared reflected light from a nearby object by using the photodiode. When sufficient reflected light is detected, the terminal 100 may determine that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using a temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the terminal 100 in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The terminal 100 interacts with a network through the SIM card, to implement functions such as calling and data communication. In some embodiments, the terminal 100 uses an eSIM, namely, an embedded SIM card. The eSIM card may be embedded in the terminal 100, and cannot be separated from the terminal 100.

The terminal 100 may further include a magnetometer (not shown in the figure), which may also be referred to as an electronic compass or a compass, and may be configured to detect intensity and a direction of a magnetic field.

With descriptions of the foregoing implementations, a person skilled in the art may clearly understand that this application may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination should also be included in the protection scope of the computer-readable medium.

In summary, what is described above is merely embodiments of the technical solutions of this application, but is not intended to limit the protection scope of this application. Any modification, equivalent replacement, or improvement made according to the disclosure of this application shall fall within the protection scope of this application.

What is claimed is:

1. A transmit power control method performed by a terminal, comprising:
   connecting to a 4G network device over an LTE link and connecting to a 5G network device over an NR link, wherein a transmit power of the terminal on the NR link is a first transmit power;
   determining to send a first data packet over the NR link;
   adjusting the first transmit power to a second transmit power when the first data packet meets a preset condition, wherein the second transmit power is greater than the first transmit power; and
   sending the first data packet at the second transmit power over the NR link,
   wherein that the first data packet meets a preset condition comprises:
   the first data packet is generated by a preset application in the terminal,
   the first data packet is generated in a preset scenario in a preset application, or
   the first data packet's priority is higher than a preset priority.

2. The method according to claim 1, wherein the method further comprises:
   determining to send a second data packet over the LTE link;
   determining that a transmit power of the terminal on the LTE link is a third transmit power, wherein a sum of the third transmit power and the second transmit power is less than or equal to a total transmit power of the terminal; and
   sending the second data packet at the third transmit power over the LTE link.

3. The method according to claim 1, wherein the second transmit power is:
   a preset value or
   a transmit power calculated based on a power control parameter corresponding to the first data packet, and the power control parameter comprises at least one of a resource bandwidth occupied by the first data packet or a closed-loop power control adjustment value of a channel corresponding to the first data packet.

4. The method according to claim 1, wherein the first data packet comprises at least one of the following: an NR PUCCH, an NR SRS, or an NR PRACH.

5. The method according to claim 1, wherein before the adjusting the first transmit power to the second transmit power, the method further comprises: determining that the first transmit power does not satisfy a transmit power requirement of the first data packet.

6. A terminal, comprising:
   a processor; and a computer storage medium, wherein the computer storage medium comprises instructions, and when the processor executes the instructions, the terminal is enabled to perform the following actions:
connecting, by the terminal, to a 4G network device over an LTE link and connecting to a 5G network device over an NR link, wherein a transmit power of the terminal on the NR link is a first transmit power;
determining to send a first data packet over the NR link;
adjusting the first transmit power to a second transmit power when the first data packet meets a preset condition, wherein the second transmit power is greater than the first transmit power; and
sending the first data packet at the second transmit power over the NR link,
wherein the first data packet meets a preset condition comprises:
the first data packet is generated by a preset application in the terminal,
the first data packet is generated in a preset scenario in a preset application, or
the first data packet's priority is higher than a preset priority.

7. The terminal according to claim 6, wherein the terminal further performs the following actions:
determining to send a second data packet over the LTE link;
determining that a transmit power of the terminal on LTE link is a third transmit power, wherein a sum of the third transmit power and the second transmit power is less than or equal to total transmit power of the terminal; and
sending the second data packet at the third transmit power over the LTE link.

8. The terminal according to claim 6, wherein the second transmit power is:
a preset value, or
a transmit power calculated based on a power control parameter corresponding to the first data packet, and the power control parameter comprises at least one of a resource bandwidth occupied by the first data packet or a closed-loop power control adjustment value of a channel corresponding to the first data packet.

9. The terminal according to claim 6, wherein the first data packet comprises at least one of the following: an NR PUCCH, an NR SRS, or an NR PRACH.

10. The terminal according to claim 6, wherein the terminal is further enabled to perform the following action:
determining that the first transmit power does not satisfy a transmit power requirement of the first data packet.

11. A chip system, applied to a terminal, wherein the chip system comprises an application processor and a baseband processor, wherein
the application processor is configured to:
run an application in response to a user operation to generate a first data packet; and
send the first data packet to the baseband processor; and
the baseband processor is configured to:
receive the first data packet;
determine to send the first data packet over an NR link;
when the first data packet meets a preset condition, adjust a first transmit power of the terminal on the NR link to a second transmit power, wherein the second transmit power is greater than the first transmit power;
send the first data packet at the second transmit power over the NR link,
wherein the first data packet meets a preset condition comprises:
the first data packet is generated by a preset application in the terminal, or
the first data packet is generated in a preset scenario in a preset application, or
the first data packet's priority is higher than a preset priority.

12. The chip system according to claim 11, wherein the application processor is further configured to:
generate and send a second data packet; and
the baseband processor is further configured to:
receive the second data packet;
determine to send the second data packet over an LTE link;
determine that a transmit power of the terminal on the LTE link is a third transmit power, wherein a sum of the third transmit power and the second transmit power is less than or equal to a total transmit power of the terminal; and
send the second data packet at the third transmit power over the LTE link.

13. The chip system according to claim 11, wherein the second transmit power is:
a preset value, or
a transmit power calculated based on a power control parameter corresponding to the first data packet, and the power control parameter comprises at least one of a resource bandwidth occupied by the first data packet or a closed-loop power control adjustment value of a channel corresponding to the first data packet.

14. The chip system according to claim 11, wherein the first data packet comprises at least one of the following: an NR PUCCH, an NR SRS, or an NR PRACH.

* * * * *